(12) United States Patent
Leonard

(10) Patent No.: US 12,454,049 B2
(45) Date of Patent: Oct. 28, 2025

(54) INVERSE KINEMATICS COMPUTATIONAL SOLVER SYSTEM, METHOD, AND APPARATUS

(71) Applicant: Krux Kinematics LLC, Brier, WA (US)

(72) Inventor: Jess T. Leonard, Brier, WA (US)

(73) Assignee: Krux Kinematics LLC, Brier, WA (US)

(*) Notice: Subject to any disclaimer, the term of this patent is extended or adjusted under 35 U.S.C. 154(b) by 570 days.

(21) Appl. No.: 17/741,261

(22) Filed: May 10, 2022

(65) Prior Publication Data

US 2023/0364783 A1 Nov. 16, 2023

(51) Int. Cl.
B25J 9/16 (2006.01)

(52) U.S. Cl.
CPC ... B25J 9/1607 (2013.01); *G05B 2219/39001* (2013.01); *G05B 2219/41405* (2013.01)

(58) Field of Classification Search
CPC ......... B25J 9/1607; G05B 2219/39001; G05B 2219/41405
See application file for complete search history.

(56) References Cited

U.S. PATENT DOCUMENTS

2023/0330851 A1* 10/2023 Khurana ................ B25J 9/1641

OTHER PUBLICATIONS

Ramachandran, Srinivasan, and Nigel W. John. "A Fast Inverse Kinematics Solver using Intersection of Circles." TPCG. 2013. (Year: 2013).*
Aristidou, A., and Lasenby, J., "FABRIK: A fast, iterative solver for the Inverse Kinematics Problem," Graphical Models 73:243-260, 2011.
Aristidou, A., et al., "Extending FABRIK with model constraints," Computer Animation and Virtual Worlds, 27:35-57, 2016.
Bermudez, L., "Overview of Jacobian IK," Unity3DAnimation, Jul. 29, 2017.
Hadfield, H. et al., "The Forward and Inverse Kinematics of a Delta Robot," University of Cambridge, Department of Engineering, Cambridge, UK, Nov. 9, 2020.
Popovic, M.B., Biomechatronics, Chapter 2, section 2.2.2, Academic Press, an imprint of Elsevier, London, United Kingdom, 2019.
Srinivasan R. and John, N.W., "A Fast Inverse Kinematics Solver using Intersection of Circles",,\ EG UK Theory and Practice of Computer Graphics, Sylvester Czanner and Wen Tang, Eds., Jul. 2013.

* cited by examiner

*Primary Examiner* — Adam R Mott
*Assistant Examiner* — Matthew C Gammon
(74) *Attorney, Agent, or Firm* — AEON Law, PLLC; Adam L.K. Philipp; James Namiki

(57) ABSTRACT

One or more methods, apparatuses, and systems to perform inverse kinematics to move an end effector of a kinematic chain from a starting location toward a target location and to move mid-joints in response thereto according to a subspace of a mid-joint, wherein the subspace is determined according to objects determined around adjacent joints of the mid-joint. The kinematic chain may comprise branches and the methods, apparatuses, and systems may determine an execution order of the branches.

20 Claims, 16 Drawing Sheets

INVERSE KINEMATICS COMPUTATIONAL SOLVER SYSTEM, METHOD, AND APPARATUS

FIELD

The present disclosure relates to a computing device, in particular to, a computing device to determine inverse kinematics with respect to systems of joints and links.

BACKGROUND

Kinematics is a subfield of physics, classical mechanics, and math which describes motion of one or more rigid bodies ("bodies," "bones," "links," "linkages," "objects") about joints; two bodies connected at a joint are also referred to as a "kinematic pair." Kinematics is not concerned with external forces that cause bodies to move, but with modeling motion and constraints of the joints. In mechanical engineering, robotics, and biomechanics, kinematics uses coordinate vectors to describe motion of links and systems of links relative to an origin of a frame of reference.

An origin of a frame of reference in a non-rotating 3-dimensional space is a point with Euclidian coordinate values of 0, 0, 0 (x, y, z). A link may occupy the 3-dimensional space with coordinates defined relative to the origin of the frame of reference. For example, for a frame of reference in a 3-dimensional space with origin at 0, 0, 0, a link may have a first end at 1, 0, 0 and a second end at 2, 0, 0; the link is 1 unit long, beginning one unit away from 0, extending along the x-axis.

For the purposes of kinematics, when two or more links are rigid, attached to one another, and cannot translate or rotate relative to one another, they are generally not described as two or more links but are described as one link. Bodies may occupy spaces that are complex, though may be idealized in simpler forms in kinematic functions.

Links may translate through 3-dimensional space and may rotate with three degrees of rotation defined relative to planes in the 3-dimensional space. In kinematics, such motion is described as 6 degrees of freedom, wherein the 6 degrees of freedom comprise 3 degrees of translation and 3 angles of rotation.

In kinematics, two or more links may be connected by a joint, forming a kinematic pair; generally, three connected links are called a "kinematic chain." The kinematic pair or kinematic chain allows one link to move relative to another, but with a constraint or joint in at least one of the six degrees of freedom. Constraints or joints are commonly classified as "lower pairs," "higher pairs," and "wrapping pairs." Generally speaking, a lower pair is a holonomic constraint which requires that a point, line, or plane in a moving body maintain contact with a point, line, or plane in a fixed body. Generally speaking, a higher pair is a constraint which requires that a curve or surface in the moving body maintain contact with a curve or surface in the fixed body. Generally speaking, a wrapping pair is a constraint imposed by a belt, chain, or similar. This type of pair is similar to a higher pair, but with multiple points of contact.

A link with a fixed location in the coordinate space may be referred to as a "base" or "root." An end of a kinematic chain may be referred to as an "end effector."

Forward kinematics describes transformations along a kinematic chain comprising links and joint parameters. Forward kinematics directly calculates a sequence of transformations and movement of the end effector, starting with the root and proceeding along subsequent joints and subsequent links of the kinematic chain to the end effector.

Inverse kinematics is the inverse of forward kinematics. For a given kinematic chain, inverse kinematics starts with a target pose for the end effector and determines or tries to determine transformations of the kinematic chain which can achieve the target pose for the end effector. For example, in animation, a kinematic chain may be used to model a human body. The human body may be standing on the ground (the ground being a "fixed body"). An animator may want the human body to move to a pose in which a hand of the body grasps a cup on a table. The hand is the "end effector" and the final or "target" pose is the hand, the end effector, grasping the cup on the table. The animator may start with the body in a first pose and manipulate components of the body like a marionette in a "forward kinematic" approach, to result in the hand grasping the cup. However, this approach is labor intensive and there may be a bewildering array of pushes and rotations of body components to perform, image frames to create, and camera viewing angles to adjust along the way. Animators prefer to pose the body in the first pose and in the target pose, define a (potentially dynamic) camera view angle, define a period of time, and have a computer animation system perform inverse kinematics to determine motions of the body to move the body from the from the first pose to the target pose over the period of time. Ray tracing or similar techniques are then performed to determine what the (dynamic) camera view angle sees over the period of time as the camera view angle changes as the computer animation system moves the human body from the first pose to the target pose.

However, inverse kinematics is more difficult than forward kinematics because there can be many movements which can result in the desired target pose, because areas of the solution space, on examination, may turn out to be empty (these areas would require that the system of joints and links do things it cannot—it may be computationally difficult to determine the empty spaces), and because many of the movements may appear "unnatural". Mapping all of many possible movements and the empty solution space is computationally expensive and, in any event, additional effort must be expended to select a "natural" movement.

Previous inverse kinematic solvers address these issues in three types of ways characterized as analytic solvers, numerical solvers, and heuristic solvers.

Analytic solvers state the inverse kinematics problem as a closed-form expression that takes the end effector target pose as input and returns joint positions as output. Analytic solvers, however, are known to not necessarily output locally smooth movement solutions between adjacent poses. This can cause instability if iterative solutions are required, such as if the inverse kinematics problem is solved inside of a high-rate control loop.

Numerical solvers typically use a Jacobian inverse technique. These methods compute change in motion to achieve the target pose and propagate this change down from the end effector to the root to converge on a solution for every pose in the system. Generally, these solutions use iterations to optimize for errors which accumulated between poses and to identify empty solution spaces. However, numerical solvers are computationally expensive, especially when additional variables are taken into consideration, such as joint angles.

Heuristic solvers have been developed that rely on simple iterative operations to gradually lead to an approximation of the solution. While these methods address computational cost, heuristic methods, by definition, are an approximation, may produce impossible motions, and may produce "unnatural" movements. Animators may experiment with different heuristic solvers which have different aesthetic "flavors" and select one which produces the most "natural" movements for a given setting, in the animator's judgment.

In academic work discussing kinematics, it was known that a link around a joint can be visualized to form a sphere around such joint and that adjacent spheres around adjacent joints may be visualized to overlap, forming a circle on the overlap perimeter. Discussing this visualization, academic works have stated as follows: "Clearly if 'input' and 'output' degrees of freedom are not matched, the inverse kinematics may be futile as there may be either infinitely many or no solutions" or, "even in our case with well-matched degrees of freedom, there may be no solution, one single solution or two solutions for inverse kinematics corresponding, respectively, to no intersection between circles centered at joint 1 and end effector, and with radii equal to appropriate links' lengths, two circles touching each other defining singular position of joint 2, and two intersecting points defining two possible solutions for joint 2". BIOMECHATRONICS, Chapter 2, section 2.2.2, provided in an Information Disclosure Statement in conjunction with this application. The foregoing visualization of spheres, intersecting spheres, and overlap perimeter was not understood to provide a way to avoid the traditional approaches of analytic, numerical, or heuristic solvers, with the problems discussed above.

Needed is a kinematics computational solver which may be executed in real time or with reduced computational cost, which may produce smooth and stable motion of a kinematic chain, and which may productively advance the concept of intersecting spheres around adjacent joints which form an overlap perimeter; the kinematics computational solver may operate in an inverse kinematic direction, though may also operate in a forward kinematic direction or may operate in a direct solving mode to address edge cases; the kinematics computation solver may also be able to address kinematic chains comprising branches.

DETAILED DESCRIPTION

Figure 1:
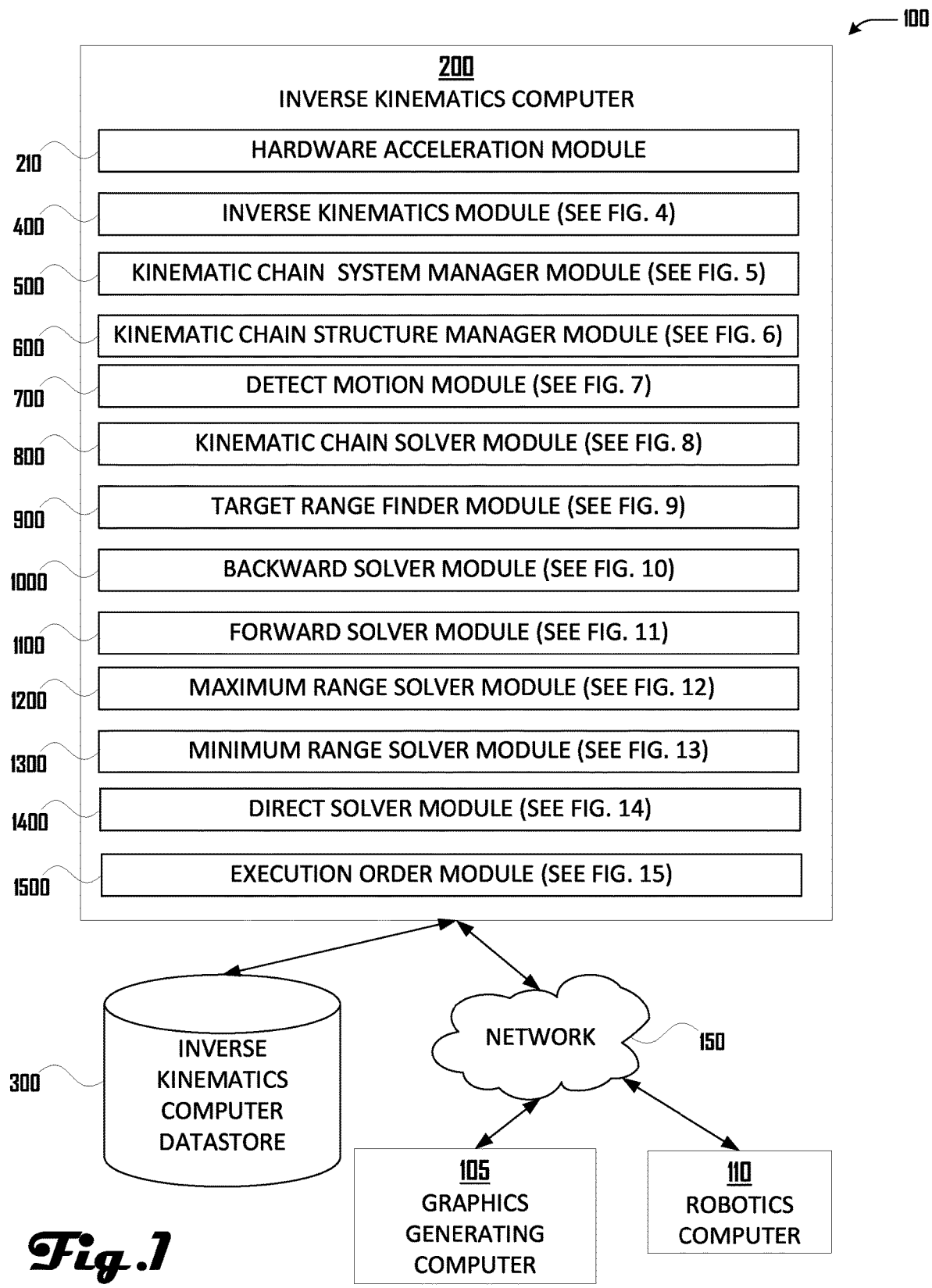
FIG. 1 is a network and device diagram illustrating an example of an inverse kinematics computer device, an inverse kinematics computer device datastore, a graphics generating computer device, a robotics computer device and a network incorporated with teachings of the present disclosure, according to some embodiments.

In addition to other locations, defined terms may be found at the end of this Detailed Description.

As used herein, a "kinematic chain" comprises at least three joints and at least two links; the at least three joints comprise a root joint, one or more mid-joints, and at least one end effector ("effector"); the at least two links span from the effector to an effector-facing mid-joint, between other of the one or more mid-joints (if any), and between a root-facing mid-joint of the one or more mid-joints and the root. The kinematic chain may be associated with one or more targets; the target is a location to or toward which a kinematic chain solver attempts to move the effector(s) and the remainder of the kinematic chain. The kinematic chain may comprise a plurality of kinematic chain branches ("branches"), wherein branches are connected at shared joints (joints shared by the branches). Branches may each be associated with a target.

As used herein, "kinematic direction" is from root joint to effector joint.

In overview, this disclosure relates to an apparatus and methods performed by and in an inverse kinematics computer device apparatus, e.g. inverse kinematics computer 200, to determine a transformation of a kinematic chain with an inverse kinematics module, wherein the transformation is to move an end effector of the kinematic chain from a starting location toward a target location and wherein to determine the transformation of the kinematic chain to move the end effector from the starting location toward the target location, the inverse kinematic module is to determine a subspace of each of the at least one mid-joint and a range of the kinematic chain, and is to determine the transformation of the kinematic chain according to the subspace of each of the at least one mid-joint and the range of the kinematic chain.

In overview, inverse kinematics module 400 is to perform a kinematic chain system manager module 500, to obtain a plurality of joints, links, and targets and to create a kinematic chain structure list in kinematic system 355, wherein kinematic system 355 comprises one or more separate kinematic chains 305 (separate kinematic chains are kinematic chains which do not share a joint or link). While kinematic system 355 is constant, inverse kinematics module 400 may perform a kinematic structure manager module 600. For each kinematic chain 305 in kinematic system 355, kinematic structure manager module 600 may perform execution order module 1500 and determine whether the then-current kinematic chain 305 is a branching kinematic chain. For kinematic chains which comprise branches 310, execution order module 1500 may determine execution order 360 for branches 310.

Kinematic structure manager module 600 may further call or perform detect motion module 700 to determine whether direct motion occurs in a branch 310 ("direct motion" is motion performed directly on a joint by a user or an external process, not driven by a target nor by a joint moving in response to movement of a target) or whether target motion occurs in a branch 310 (movement of branch 310 as branch 310's effector 350 attempts to move to a new target 330 location). When detect motion module 700 detects direct motion or target motion in branch 310, detect motion module 700 sets such branches 310 as "alpha" branches (branches in which motion is to be performed before motion is to be performed in "beta" branches) and further sets start index 335 and end index 340 for portions of kinematic chain 305 temporarily controlled by each such branch 310. For all remaining branches 310 which are not alpha branches, detect motion module 700 sets such remaining branches 310 as "beta" branches.

Proceeding then in determined execution order 360 and first among alpha branches 310 which had direct or target motion, kinematic structure manager module 600 may then call or perform kinematic chain solver module 800 (described further below) to determine motion to perform in relation to such alpha branches 310 in response to motion that is driven by one or more target(es) 330 or by direction motion by a user or external process. After processing alpha branches 310 which had direct or target motion, kinematic structure manager module 600 may then call or perform kinematic chain solver module 800 to determine motion to perform in relation to beta branches 310, wherein beta branches 310 move in response to movement of shared joints 325 between such beta branches 310 and alpha branches 310. As noted, beta branches 310 are processed after alpha branches 310; within the group of beta branches 310 and as with alpha branches 310, beta branches 310 are processed in execution order 360 determined by execution order module 1500.

To move joints and links, kinematic chain solver module 800 processes joints and links between start index 335 and end index 340. For a kinematic chain 305 with no branches, start index 335 is root 345 and end index 340 is effector 350. For a kinematic chain 305 with branches 310, start index 335 and end index 340 are determined by detect motion module 700. As described further herein, for alpha branches, start index 335 may be root 345 for the first branch 310; for subsequent branches 310, start index 335 is a joint shared by such subsequent branch 310 with the previous alpha branch 310 in the execution order which had motion, a shared joint 325. As described further herein, for alpha branches 310, end index 340 may be an effector of such alpha branch 310. As described further herein, for beta branches, start index 335 may be a joint shared by such beta branch 310 with a previous branch 310 which had motion, shared joint 325. As described further herein, for beta branches 310, end index 340 may be effector 350 of such beta branch 310 (when effector 350 does not have a target, effector 350 may also or alternatively be referred to as a "terminal joint").

Processing joints and links between start index 335 and end index 340, kinematic chain solver module 800 may optionally call or perform target range finder module 900 (described further herein), may call or perform backward solver module 1000, may optionally call or perform forward solver module 1100, and may optionally call or perform direct solver 1400 module.

As discussed further herein, backward solver module 1000 determines a subspace of each of the at least one mid-joint according to intersection of objects which kinematic chain solver module 800 determines around adjacent joints of each of the at least one mid-joint. The objects may be determined according to lengths of links between the mid-joints. That is, an object of a mid-joint is a three-dimensional space that at least partially surrounds the mid-joint that a link connected to the mid-joint can freely rotate around the mid-joint. The objects may be, for example, spheres, such as when the links are free to rotate about their joints in any of the 3 degrees of rotation. Constraints may limit the degrees of freedom, in which case, the objects may be portions of spheres. The intersection of the objects may form, for example, a disk, a point, or may be undefined.

Backward solver module 1000 may place the mid-joint in a new position, where the new position is on the perimeter of the intersection of the objects. Backward solver module 1000 may place the mid-joints on the perimeter of the intersection of the objects in the new position closest to the then-current position of each of the mid-joints (the then-current position being the position before being moved to the new position). Backward solver module 1000 may place the mid-joints on the perimeter of the intersection of the objects closest to then-current position of each of the mid-joints working "backward" or in the inverse kinematic direction, starting with the mid-joint closest to effector 350 or end index 340 and working toward root 345 or start index 345. In the discussion herein, the "previous position" may be the then-current position of the joint before it is moved to the new position.

In situations in which backward solver module 1000 produces an error or an ambiguous situation, backward solver module 1000 may determine a new position for a mid-joint which is not on a perimeter of the intersection of objects closest to a then-current position of the mid-joints. Errors or ambiguous situations may occur, for example, when two objects are coincident and the intersection forms a sphere, when one is contained within the other such that there is no intersection, when the two objects are too far apart to intersect, or when the then-current position of the mid-joint aligns with the disk center of the intersection, so that the entire intersection is equidistant to the then-current position of the mid-joint and no disk placement direction can be determined.

When the backward or inverse kinematic direction produces an error or an invalid joint, kinematic chain solver module 800 may leave the joints in the newly solved positions provided by backward solver module 1000 and may call or perform forward solver module 1100 to work "forward", starting with the mid-joint closest to start index 335 and working toward end index 340, again determining a subspace for each mid-joint, wherein the subspace is defined by objects around adjacent joints of the mid-joints and again first attempting to place the mid-joints on the perimeter of the intersection of the objects closest to a then-current position of each of the mid-joints. As with backward solver module 1000, forward solver module 1100 may determine that an error or ambiguous situation has occurred and may determine a new position for a mid-joint which is not on a perimeter of the intersection of objects closest to a then-current position of the mid-joints.

Kinematic chain solver module 800 may optionally call or perform target range finder module 900 to determine a range of the kinematic chain. Performance of target range finder module 900 may provide a "shortcut" when the target moves to a location that is outside of the range of the then current branch 310 of kinematic chain 305. The range may be determined with respect to a maximum range and a minimum range. The maximum range may be understood as the maximum "reach" of the then current branch 310 of kinematic chain 305 and may be determined according to the sum of all link lengths of branch 310. The minimum range only exists as a limitation on the reach of the then current branch 310 of kinematic chain 305 when the root link (or link of the end index joint and its adjacent joint) is longer than the sum of all other links. In other words, the minimum range occurs when the root link, d_0, minus the sum of all other links, is a positive value. The minimum range may be determined in this manner because, when the root link is longer than the sum of all other links, the effector may not be able to reach back across the length of the root link to a target which is toward the root link, even if the kinematic chain (or branch thereof) is folded back upon itself; in this case, the target may be inaccessible because it is in the space between the root link and the space into which the end effector cannot reach (d_0 minus the sum of all other links). If the root link, d_0 is shorter than the sum of all other links, then there is no minimum range limitation. Thus, while the maximum range may be the sum of all link lengths, the minimum range occurs when the root link, minus the sum of all other links, is a positive value.

When kinematic chain solver module 800 determines that target 330 is beyond the maximum or minimum range of kinematic chain 305 or a then-current branch 310, kinematic chain solver module 800 may optionally, the inverse kinematics module may approach this circumstance with a shortcut generally described in relation to target range finder 900 module. In the shortcut, if the maximum range has been exceeded, the target range finder 900 module may call maximum range module 1200, and align the kinematic chain in a straight line, pointing toward the target. In the shortcut, if the minimum range has been exceeded, the target range finder 900 module may call minimum range module 1300, align the kinematic chain in a straight line oriented between the root and the target, with the root link (sometimes denoted as P_0 and or as P_R) pointing past and along the path of the target, the P_1 joint (the immediately joint adjacent to the root) positioned at the end of the root link, and the remaining mid-joints pointing in toward the target along the line of the root link; in sum, with the root link passing over the target and the remaining mid-joints folded back over the root link, extending back toward the target.

Kinematic chain solver module 800 may also directly solve the coordinates of individual joints by calling direct solver module 1400. This may occur when the root joint is allowed to move, if an invalid joint condition has been detected, with respect to an effector at the conclusion of the forward solver process, or in situations in which a solution on a perimeter of the intersection of objects closest to a then-current position of the mid-joints cannot be found or imputed.

Determining a transformation of a kinematic chain in this manner results in reduced computational complexity compared to previous inverse kinematics solvers, without the use of rotation angles and matrices. Determining a transformation of a kinematic chain in this manner may result in "natural" or "realistic" movement of the kinematic chain. Determining a transformation of a kinematic chain in this manner allows an inverse kinematics module to follow a method which minimizes movement of joints and allows exit without processing all joints in a kinematic chain unlike, for example, heuristic methods which tend to require solving and moving every joint, with iterations to improve position of the end effector relative to the target.

FIG. 1 is a network and device diagram illustrating an example of an inverse kinematics computer 200, inverse kinematics computer datastore 300, graphics generating computer device 105, robotics computer device 110 and network 150 incorporated with teachings of the present disclosure, according to some embodiments.

Inverse kinematics computer 200 may perform modules such, as for example, inverse kinematics module 400, kinematic chain system manager module 500, kinematic chain structure manager module 600, detect motion module 700, kinematic chain solver module 800, target range finder module 900, backward solver module 1000, forward solver module 1100, maximum range solver module 1200, minimum range solver module 1300, direct solver module 1400, and execution order module 1500. As described herein, these modules may be in kinematics computer device memory 250 in inverse kinematics computer 200, including, for example, in inverse kinematics computer datastore 300.

Inverse kinematic computer 200 may perform one or more of such modules with the assistance of, for example, hardware acceleration module 210, described further herein.

Inverse kinematic computer 200 may perform one or more of such modules to provide inverse kinematics services to, for example, graphics generating computer 105 and or robotics computer 110. Graphics generating computer 105 and or robotics computer 110 may also, or alternatively, act as and be understood to be inverse kinematics computer 200 and or inverse kinematics computer datastore 300. Graphics generating computer 105 and or robotics computer 110 may perform a process which controls one or more targets 300 or which may directly move a joint, link, or the like of kinematic chain 305 being processed by inverse kinematics computer 200.

By way of example, graphics generating computer 105 may generate computer generated imagery ("CGI"), as may be used in, for example, animations, videos, video games, 2- and 3-dimensional graphics, and the like. By way of example, robotics computer 110 may control a robot, such as actuators of a robot, to move the robot in a 2-dimensional or 3-dimensional space. One or more of such computers may obtain services from or may be inverse kinematics computer 200 and or inverse kinematics computer datastore 300 and may perform modules of inverse kinematics computer 200 to perform the functions and obtain the inverse kinematics services described herein. These services may allow the generation of CGI and or may allow the generation of commands to actuators of a robot with, for example, reduced computation cost, reduced motion, and or realistic motion.

Graphics generating computer 105, robotics computer 110, and or inverse kinematics computer 200 and datastores thereof may be connected to network 150 and or one another.

Inverse kinematics computer 200 is illustrated as connecting to inverse kinematics computer datastore 300. Inverse kinematics computer datastore 300 is described further, herein, though, generally, should be understood as a datastore used by inverse kinematics computer 200.

Network 150 may comprise computers, network connections among the computers, and software routines to enable communication between the computers over the network connections. Examples of network 150 comprise an Ethernet network, the Internet, and/or a wireless network, such as a GSM, TDMA, CDMA, EDGE, HSPA, LTE or other network provided by a wireless service provider. Connection to network 150 may be via a Wi-Fi connection. More than one network may be involved in a communication session between the illustrated devices. Connection to network 150 may require that the computers execute software routines which enable, for example, the seven layers of the OSI model of computer networking or equivalent in a wireless phone network.

Figure 2:
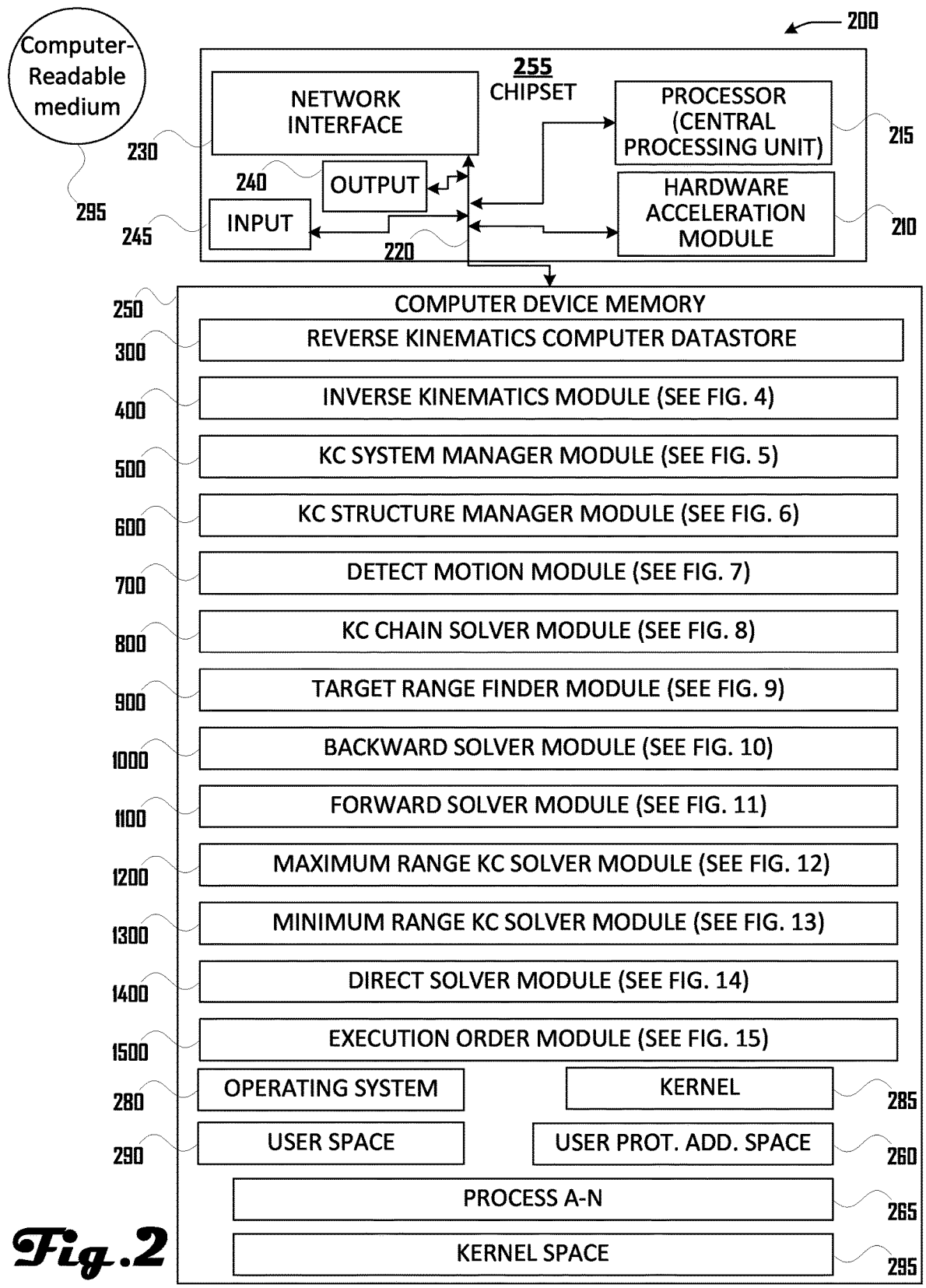
FIG. 2 is a functional block diagram illustrating an example of the inverse kinematics computer device of FIG. 1, incorporated with teachings of the present disclosure, according to some embodiments.

FIG. 2 is a functional block diagram illustrating an example of inverse kinematics computer 200 device of FIG. 1, incorporated with teachings of the present disclosure, according to some embodiments.

Inverse kinematics computer 200 may include chipset 255. Chipset 255 may include processor 215, input/output (I/O) port(s) and peripheral devices, such as output 240 and input 245, network interface 230, and computer device memory 250, all interconnected via bus 220. Network interface 230 may be utilized to form connections with network 150, with inverse kinematics computer datastore 300, or to form device-to-device connections with other computers.

Chipset 255 may include communication components and/or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 210 may provide hardware acceleration of various functions of inverse kinematics module 400, kinematic chain system manager module 500, kinematic chain structure manager module 600, detect motion module 700, kinematic chain solver module 800, target range finder module 900, backward solver module 1000, forward solver module 1100, maximum range solver module 1200, minimum range solver module 1300, direct solver module 1400, and execution order module 1500. Hardware acceleration module may be provided by, for example, Integrated Performance Primitives software library by Intel Corporation, as may be executed by an Intel (or other compatible) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support vector machine.

Hardware acceleration module may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVIlib, and others.

In embodiments, hardware acceleration module 210 may be or comprise a programmed field programmable gate array ("FPGA"), i.e., a FPGA in which gate arrays are configured with a bit stream to embody the logic of the hardware accelerated function (equivalent to the logic provided by the executable instructions of a software embodiment of the function). In embodiments, hardware acceleration module 210 may also or alternatively include components of or supporting computer device memory 250.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for modules and/or software routines, such as, for example, hardware acceleration module 210, inverse kinematics module 400, kinematic chain system manager module 500, kinematic chain structure manager module 600, detect motion module 700, kinematic chain solver module

800, target range finder module 900, backward solver module 1000, forward solver module 1100, maximum range solver module 1200, minimum range solver module 1300, direct solver module 1400, and execution order module 1500.

Computer device memory 250 may also store operating system 280. These software components may be loaded from a non-transient computer readable storage medium 295 into computer device memory 250 using a drive mechanism associated with a non-transient computer readable storage medium 295, such as a floppy disk, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
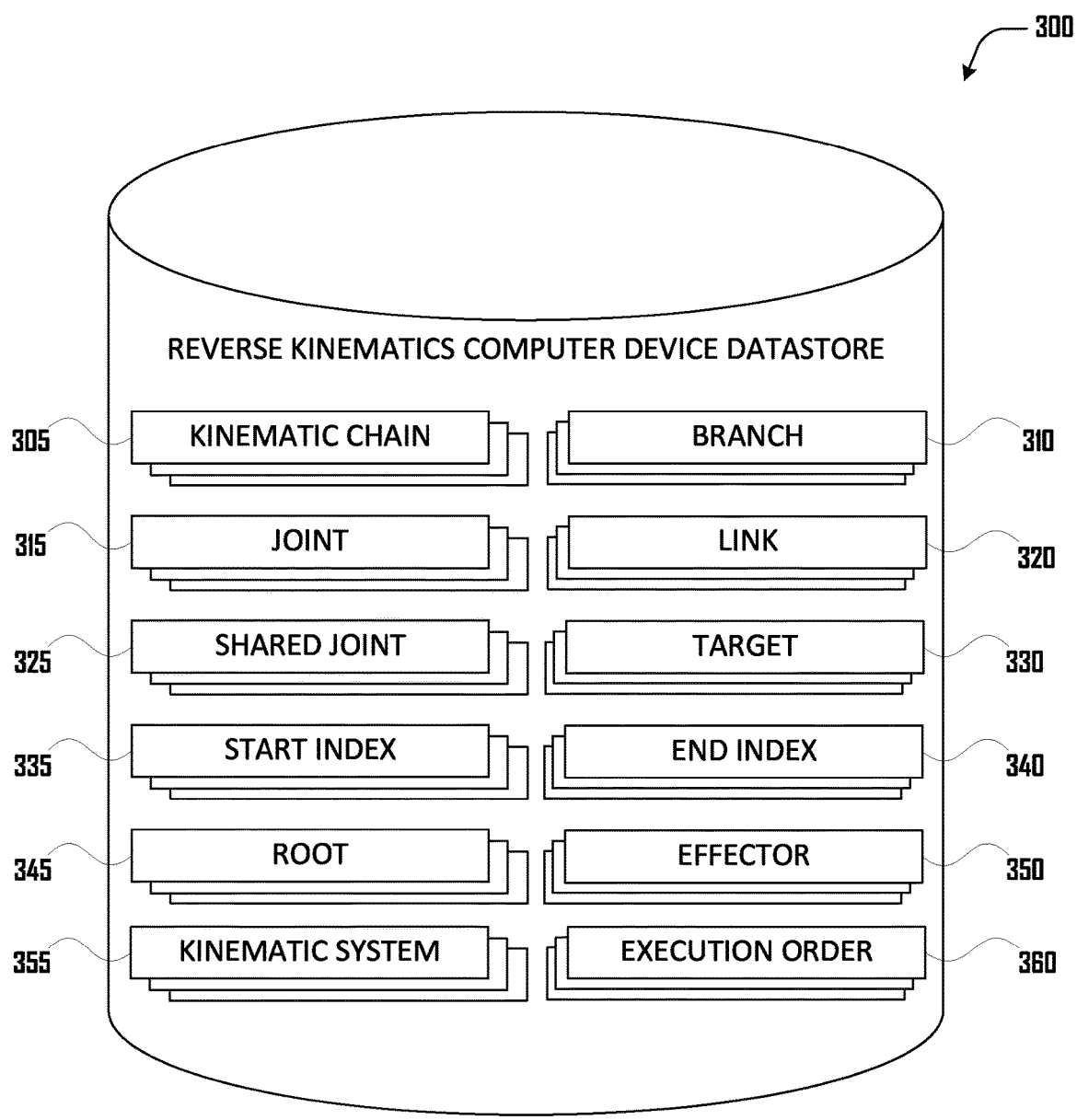
FIG. 3 is a functional block diagram illustrating an example of an inverse kinematics computer device datastore incorporated with teachings of the present disclosure, consistent with embodiments of the present disclosure.

Computer device memory 250 is also illustrated as comprising kernel 285, kernel space 295, user space 290, user protected address space 260, and inverse kinematics computer datastore 300 (illustrated and discussed further in relation to FIG. 3).

Computer device memory 250 may store one or more process 265 (i.e., executing software application(s)). Process 265 may be stored in user space 290. Process 265 may include one or more other process 265a . . . 265n. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. Operating system 280 and/or kernel 285 may attempt to protect kernel space 295 and prevent access by certain of process 265a . . . 265n.

Kernel 285 may be configured to provide an interface between user processes and circuitry associated with inverse kinematics computer 200. In other words, kernel 285 may be configured to manage access to processor 215, chipset 255, I/O ports and peripheral devices by process 265. Kernel 285 may include one or more drivers configured to manage and/or communicate with elements of inverse kinematics computer 200 (i.e., processor 215, chipset 255, I/O ports and peripheral devices).

Inverse kinematics computer 200 may also comprise or communicate via Bus 220 and/or network interface 230 with inverse kinematics computer datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. inverse kinematics computer 200 may, in some embodiments, include many more components than as illustrated. However, it is not necessary that all components be shown in order to disclose an illustrative embodiment.

FIG. 3 is a functional block diagram of the inverse kinematics computer datastore 300 illustrated in the computer device of FIG. 2, according to some embodiments. The components of inverse kinematics computer datastore 300 may include data groups used by modules and/or routines, e.g., kinematic chain 305, branch 310, joint 315, link 320, shared joint 325, target 330, start index 335, end index 340, root 345, effector 350, kinematic system 355, and execution order 360 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. The components of computer datastore 300 are discussed further herein in the discussion of other of the Figures.

Figure 4:
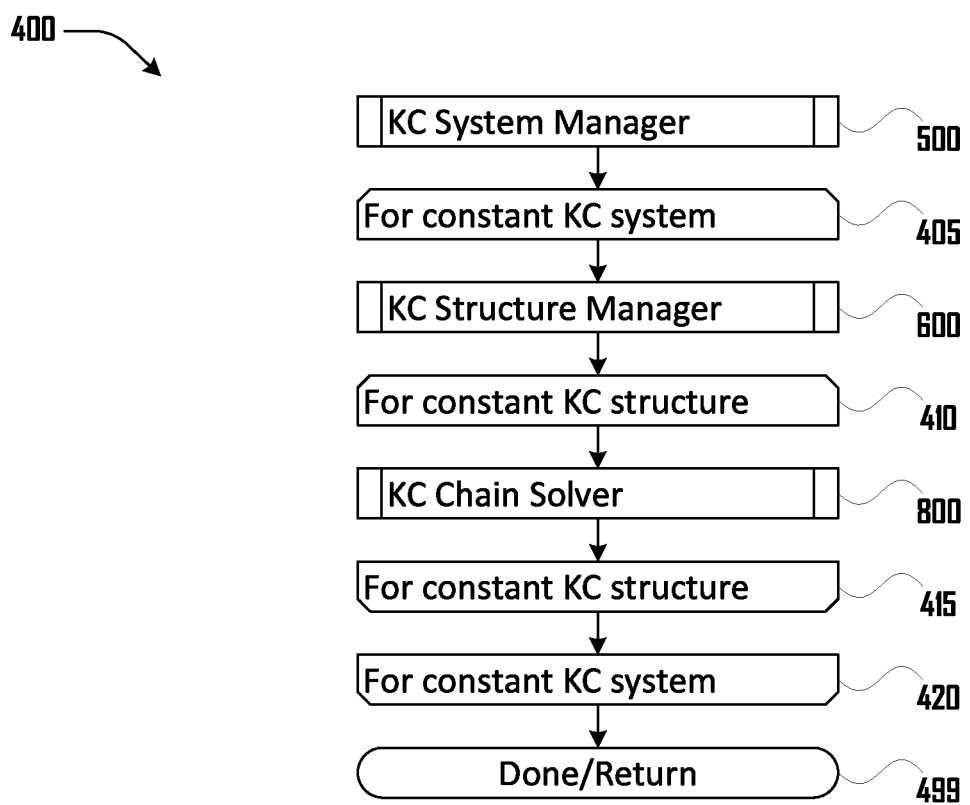
FIG. 4 is a flow diagram illustrating an example of a method performed by an inverse kinematics module, according to some embodiments.

FIG. 4 is a flow diagram illustrating an example of a method performed by inverse kinematics module 400, according to some embodiments. Inverse kinematics module 400 may be performed by, for example, inverse kinematics computer 200. These modules may be performed by or with the assistance of a hardware accelerator, such as hardware acceleration module 210.

At block 500, inverse kinematics module 400 may call or perform kinematic chain system manager module 500, described further below, to manage one or more systems of kinematic chains. A system of kinematic chains may be store in one or more kinematic system 355 records.

Opening loop block 405 to closing loop block 420 may operate while kinematic system 355 remains constant (kinematic chains 305 in kinematic system 355 may move, but the number of joints, links, and settings thereof remain constant).

At block 600, inverse kinematics module 400 may call or perform kinematic chain structure manager module 600, described further below, to manage one or more kinematic chains, kinematic chain 305, in kinematic chain system 355. A kinematic chain may be store in one or more kinematic chain 305 records.

Opening loop block 410 to closing loop block 415 may operate while one or more kinematic chain 305 of the then-current kinematic chain system 355 remains constant (kinematic chains 305 in kinematic system 355 may move, but the number of joints, links, and settings thereof remain constant).

At block 800, inverse kinematics module 400 may call or perform kinematic chain solver 800.

At done or return block 499, inverse kinematics module 400 may conclude or return to a process or module which may have called it.

Figure 5:
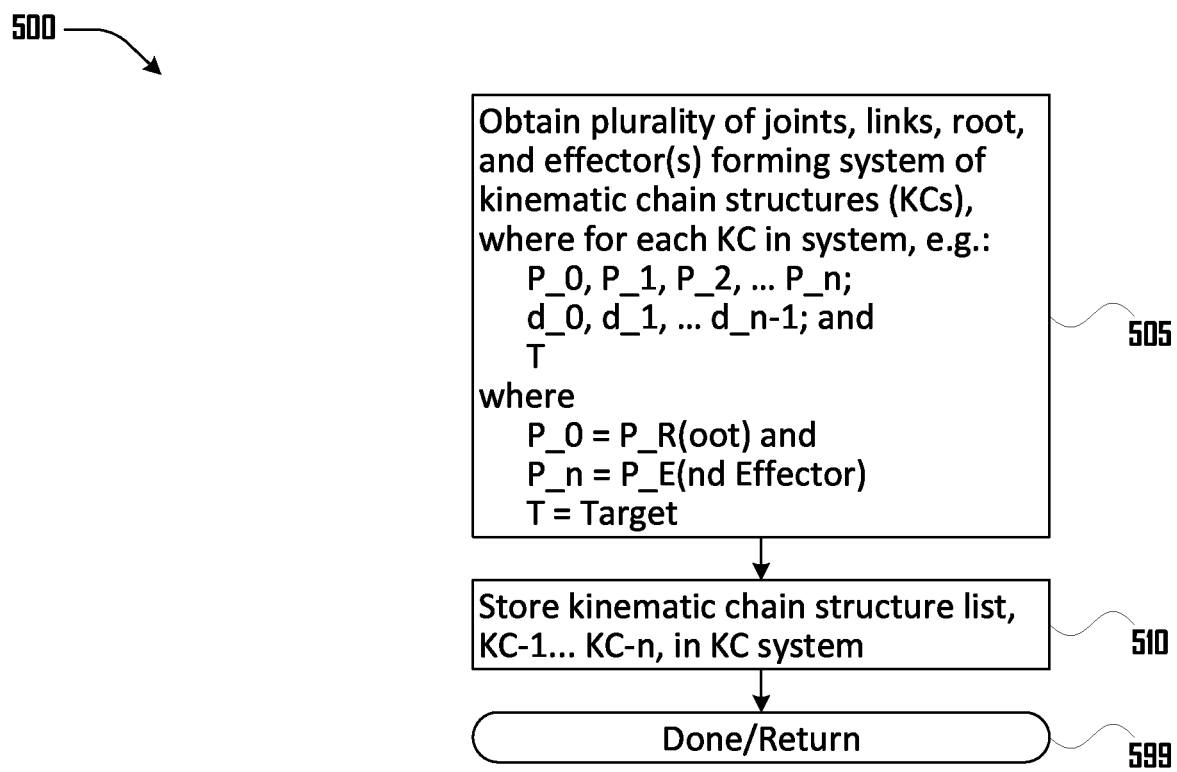
FIG. 5 is a flow diagram illustrating an example of a method performed by kinematic chain system manager module, according to some embodiments.

FIG. 5 is a flow diagram illustrating an example of a method performed by kinematic chain system manager module 500, according to some embodiments. Kinematic chain system manager module 500 may be performed by, for example, inverse kinematics computer 200. These modules may be performed by or with the assistance of a hardware accelerator, such as hardware acceleration module 210.

At block 505, kinematic chain system manager module 500 may obtain a plurality of joints and links from a user or another process. The plurality of joints and links may comprise a root, one or more effectors, and one or more targets; the foregoing may be stored as one or more joint 310, link 320, root 345, effector 350, and target 330 records.

Notation may be in the form of, for example, $P\_0$, $P\_1$, $P\_2$, ..., $P\_n$; $d\_0$, $d\_1$, $d\_2$, ..., $d\_{n-1}$; and T, where $P\_0$ may also be referred to as a root, $P\_n$ may also be referred to as the effector or end effector, and where "T" denotes "target".

At block 510, kinematic chain system manager module 500 may store the joints and links of block 505 as one or more kinematic chain 305 records in kinematic system 355.

At done or return block 599, kinematic chain system manager module 500 may conclude or return to a process or module which may have called it.

Figure 6:
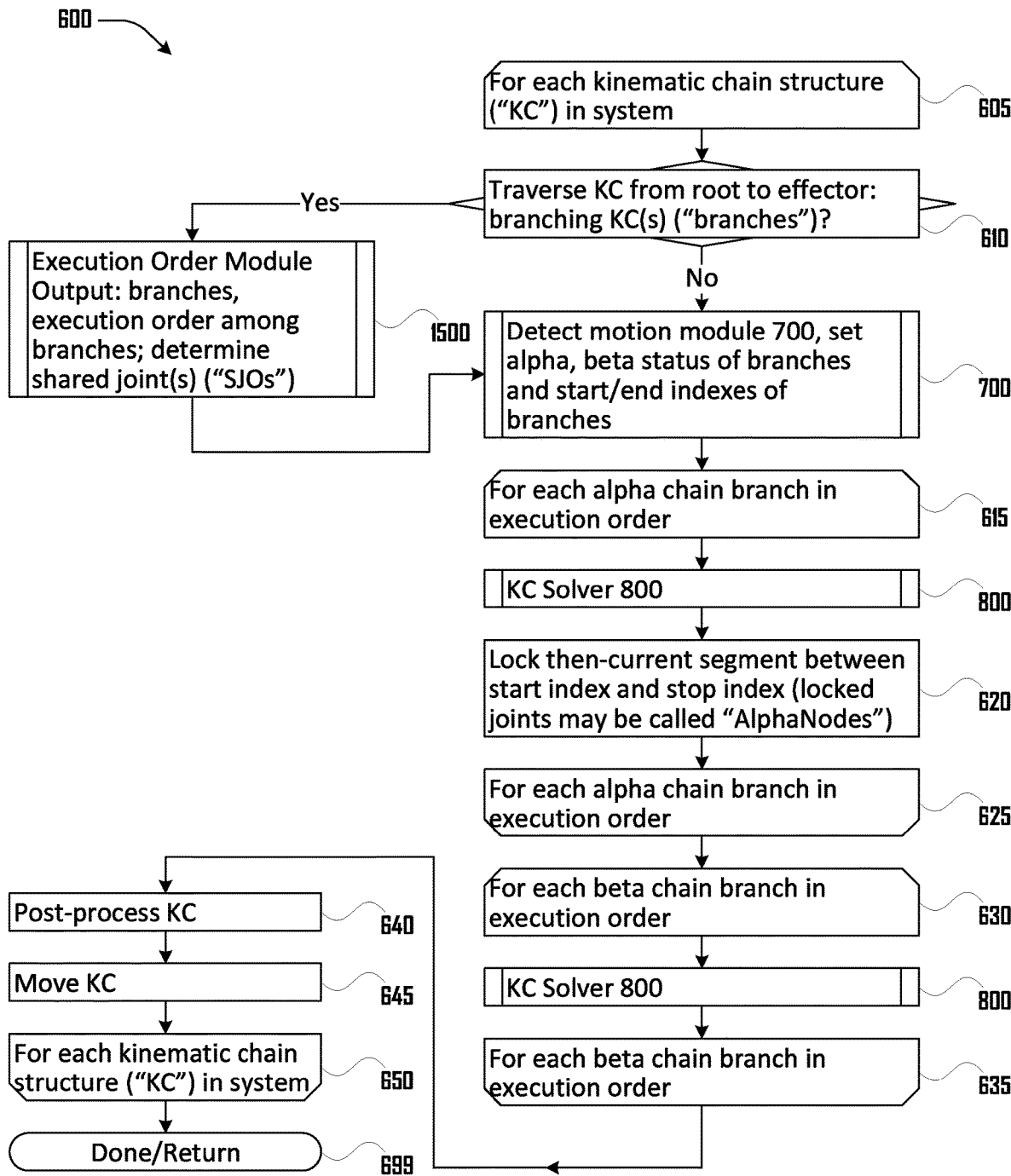
FIG. 6 is a flow diagram illustrating an example of a method performed by kinematic chain structure manager module, according to some embodiments.

FIG. 6 is a flow diagram illustrating an example of a method performed by kinematic chain structure manager module 600, according to some embodiments. Kinematic chain structure manager module 600 may be performed by, for example, inverse kinematics computer 200. These modules may be performed by or with the assistance of a hardware accelerator, such as hardware acceleration module 210.

Opening loop block 605 to closing loop block 650 may iterate over separate kinematic chain 305 in kinematic system 355.

At decision block 610, kinematic chain structure manager module 600 may determine if a then-current (in future instances, "then-current" may be left out) kinematic chain 305 comprises branches.

If affirmative or equivalent at decision block 610, at block 1500 kinematic chain structure manager module 600 may call or perform execution order module 1500, described further herein. Execution order module 1500 may determine and output branch 310 records, wherein the branch 310 records indicate the starting and ending joints of each branch in kinematic branch 305 (these are not always the same as start index 335 and end index 340), an execution order among branches, where the execution order may be stored as one or more execution order 360 records, and may determine joints that are shared between the branches and may output these shared joints as one or more shared joint 325 records.

Following block 1500 or following a negative or equivalent decision at decision block 610, at block 700 kinematic chain structure manager module 600 may call or perform detect motion module 700, described further herein. In overview, detect motion module 700 sets the alpha and beta status of branches and the start index 335 and end index 340 of branches. In the case of a negative or equivalent decision at decision block 610 and there are no branches, detect motion module 700 may nonetheless be called, for example, to identify and processes instances in which direct motion is performed on a joint by a user or outside process.

Opening loop block 615 to closing loop block 625 may iterate over each alpha chain branch in the (then-current) kinematic chain 305, in execution order 360. In the case of a kinematic chain 305 which does not comprise branches and which did not need to be processed by detect motion module 700, execution order comprises kinematic chain 305, start index 335 is root 345 and end index 340 is effector 350.

At block 800, kinematic chain structure manager module 600 may call or perform kinematic chain solver 800, as described further herein. In overview, kinematic chain solver 800 may solve a then-current portion of kinematic chain 305 between start index 335 and end index 340.

At block 620, kinematic chain structure manager module 600 may lock the then-current segment between start index 335 and end index 340.

At closing loop block 625, may return to opening loop block 615 to iterate over a next alpha chain branch in execution order 360.

At the conclusion of alpha chain branches in execution order 360, opening loop block 630 to closing loop block 635 may iterate over each beta chain branches in the (then-current) kinematic chain 305, in execution order 360.

At block 800, kinematic chain structure manager module 600 may call or perform kinematic chain solver 800, as described further herein. In overview, kinematic chain solver 800 may solve a then-current portion of kinematic chain 305 between start index 335 and end index 340.

At block 640, kinematic chain structure manager module 600 may post-process (then-current) kinematic chain 305.

At block 645, kinematic chain structure manager module 600 may move the then kinematic chain 305 according to the determined joint positions.

At closing loop block 650, kinematic chain structure manager module 600 may return to opening loop block 605 to iterate over any additional kinematic chain 305 structures in kinematic system 355.

At done block 699, kinematic chain structure manager module 600 may conclude or return to a process which may have called it.

Figure 7:
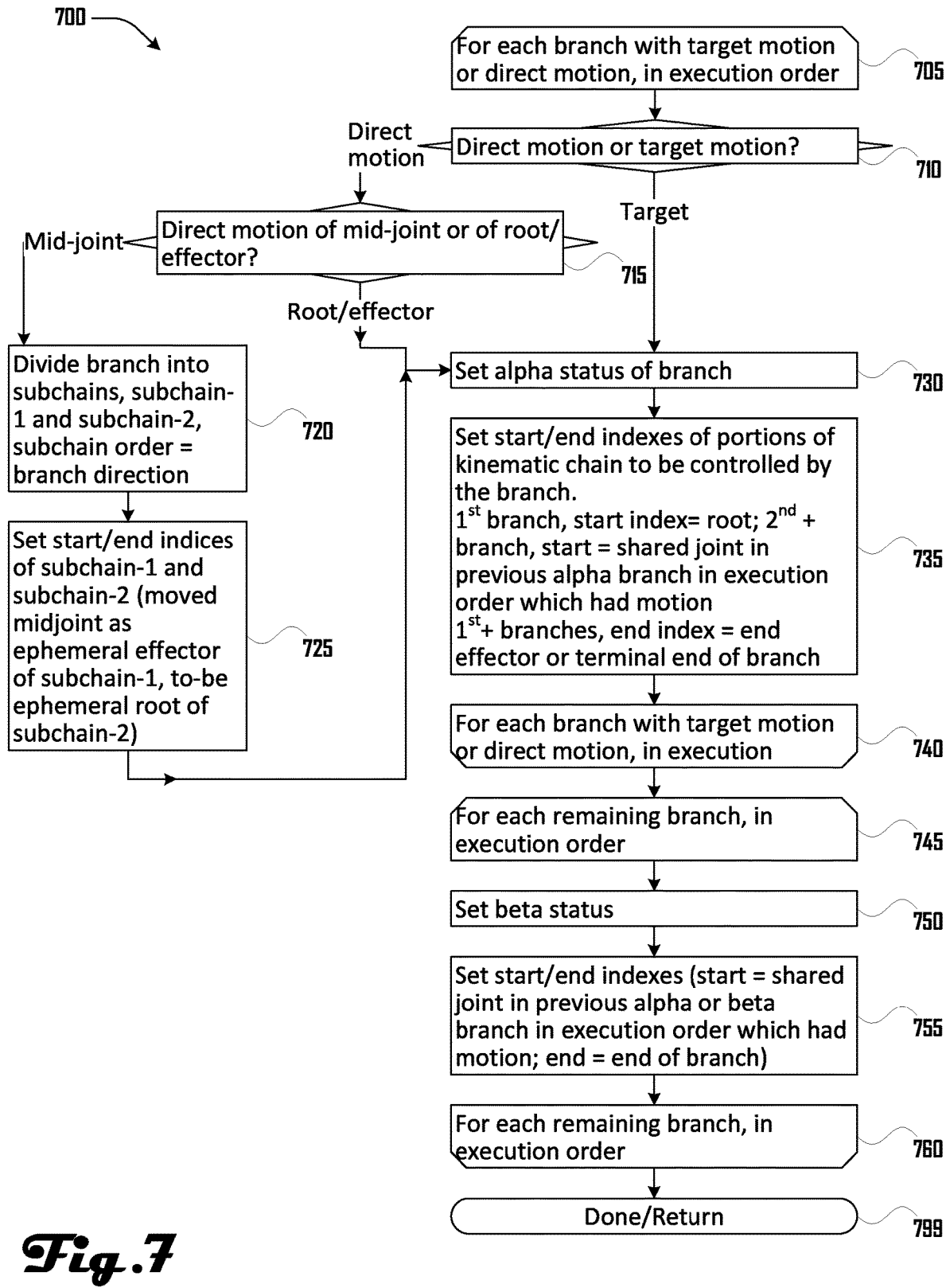
FIG. 7 is a flow diagram illustrating an example of a method performed by a detect motion module, according to some embodiments.

FIG. 7 is a flow diagram illustrating an example of a method performed by detect motion module 700, according to some embodiments. Detect motion module 700 may be performed by, for example, inverse kinematics computer 200. These modules may be performed by or with the assistance of a hardware accelerator, such as hardware acceleration module 210.

Opening loop block 705 to closing loop block 740 may iterate, in execution order 360, over branch 310 records in kinematic chain 305 which have direct motion or target motion. As noted herein, "direct motion" may be motion of a joint due to input from a user or another process, such as by "dragging" a joint. As noted herein, "target motion" may be motion of a joint caused by an effector trying to move to a target, including motion of the effector and of joints connected to the effector.

At decision block 710, detect motion module 700 may determine whether the motion is direct motion or target motion.

If direction motion or equivalent at decision block 710, at decision block 715, detect motion module 700 may determine whether the motion is direct motion of a mid-joint or is of a root or effector.

If mid-joint or equivalent at decision block 715, at block 720 detect motion module 700 may separate then (then-current) branch into two subchains, subchain-1 and subchain-2, and may set the execution order between the subchains according to the branch direction, where the subchain closer to the root is executed first and the subchain further from the root is executed after the first. Subchain-1 may be set to include the portion of branch 310 including the joint adjacent to the directly moved mid-joint to the effector of the branch. Subchain-2 may be set to include the portion of branch 310 including the moved mid-joint to a shared joint 325 connecting the branch 310 to another branch 310.

At block 725, detect motion module 700 may set start index 335 and end index 340 of subchain-1 and subjchain-2. For subchain-1, start index 335 may be set as the joint adjacent to the directly moved mid-joint and end index 340 may be set as the effector of the branch. For subchain-2, start index 335 may be set as a shared joint 325 of the previous alpha branch in the execution order which had motion (same logic as for setting start index 335 in block 735).

At block 730, which may follow decision block 710 if target motion or equivalent was detected or which may follow decision block 715 if direct motion of the root or effector was detected, detect motion module 700 may set the alpha status of (then-current) branch 310.

At block 735, detect motion module 700 may set the start index 335 and the end index 340 of portions of the kinematic chain 305 to be controlled by branch 310. The start index 335 may extend further than the (then-current) branch, because if the branch is a first branch to move, it will move all joints extending from the effector of the branch 310 down to the root. For subsequent branches, the portion of kinematic chain 304 moved by the first branch is locked (see block 620, FIG. 6) and the portion which moves in the subsequent branch extends down from the effector of the branch down to the subsequent branch's shared joint with the first branch to move.

Thus, at block 735, detect motion module 700 may set start index 335 for the first branch 310 as the root of kinematic chain 305. Thus, at block 735, detect motion module 700 may set start index 335 for branches 310 after the first branch 310, as a shared joint 325 shared between the (then-current) branch 310 and the previous branch 310, generally an alpha branch, in execution order 360 which had motion. Thus, at block 735, detect motion module 700 may set end index 340 of the (then-current) branch 310 to be the end effector or terminal end of the (then-current) branch 310.

At closing loop block 745, detect motion module 700 may return to opening loop block 705 to iterate over other branches 310, if any, with target motion or direct motion, in execution order 360.

Opening loop block 745 to closing loop block 760 may iterate over remaining branches 310, in execution order 360, which did not have direct motion or target motion.

At block 750, detect motion module 700 may set the (then-current) branch 310 as a "beta" branch 310. A beta branch 310 is a branch 310 which is to be executed after alfa branches 310 are executed. As with alpha branches 310, when there is more than one beta branch 310, they are to be processed by kinematic chain solver 800, within the group of beta branches 310, in execution order 360.

At block 755, detect motion module 700 may set start index 335 for the (then-current) branch 310 as a shared joint 325 shared between the (then-current) branch 310 and the previous branch 310, either an alpha or a beta branch, in execution order 360 which had motion. At block 755, detect motion module 700 may set end index 340 for the (then-current) branch 310 to be the end effector or terminal end of the (then-current) branch.

At closing loop block 760, detect motion module 700 may return to opening loop block 745 to iterate over any additional remaining branches 310.

At done block 799, detect motion module 700 may conclude or return to a process which may have called it.

Figure 8:
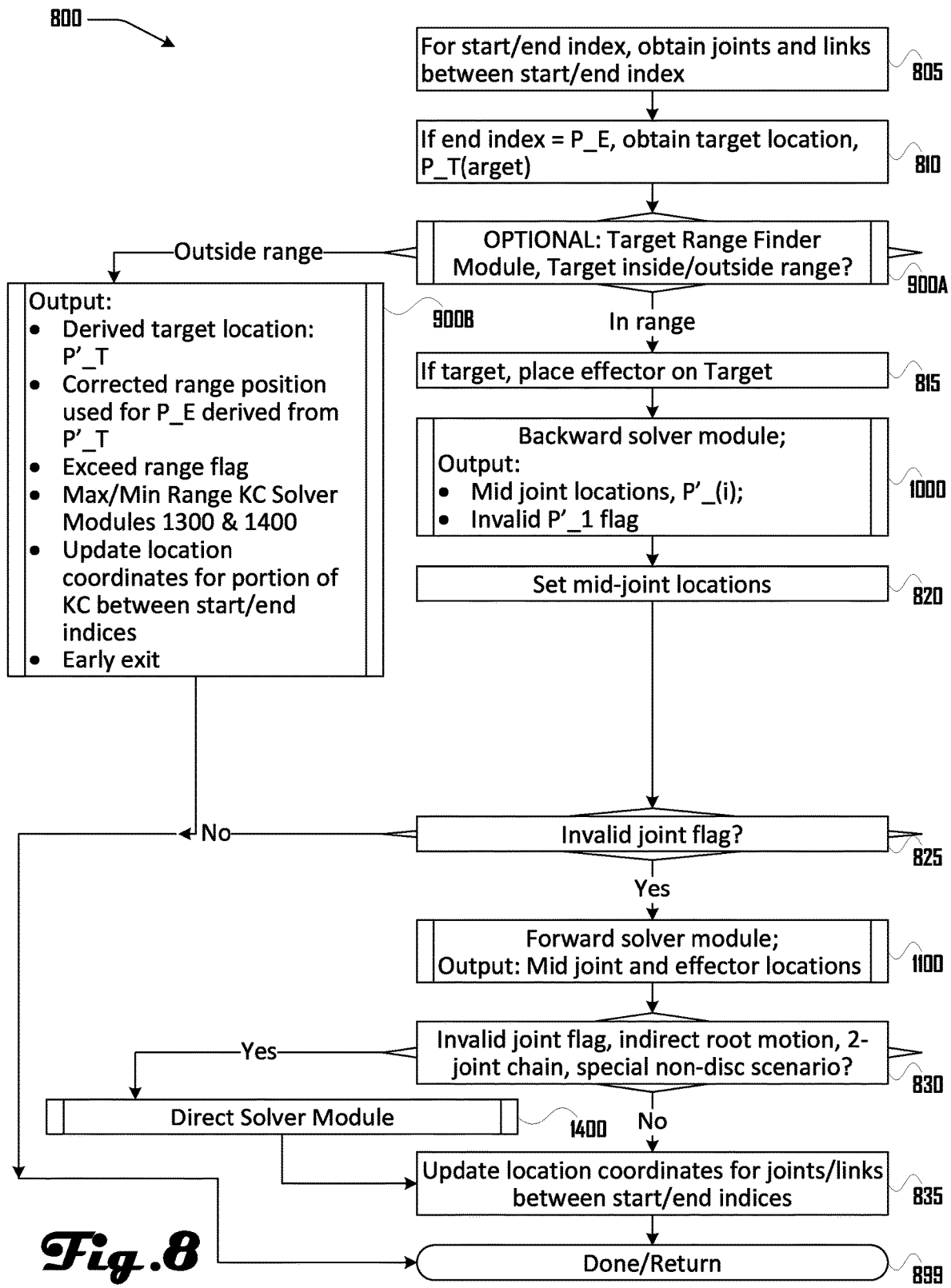
FIG. 8 is a flow diagram illustrating an example of a method performed by a kinematic chain solver module, according to some embodiments.

FIG. 8 is a flow diagram illustrating an example of a method performed by kinematic chain solver module 800, according to some embodiments. Kinematic chain solver module 800 may be performed by, for example, inverse kinematics computer 200. These modules may be performed by or with the assistance of a hardware accelerator, such as hardware acceleration module 210.

At block 805, kinematic chain solver module 800 may obtain a system of joints and links between start index 335 and end index 340 of a (then current) kinematic chain 305 which is to be processed by kinematic chain solver module 800.

At block 810, if the end index 340 is an effector, kinematic chain solver module 800 may obtain a target 330 for the end index 340, wherein the target 330 may comprise coordinates. Not all effectors of all branches of a kinematic chain may have a target; as noted herein, when they do not, such effectors may also or alternatively be referred to as a terminal joint.

At block 900A, which may be optional, kinematic chain solver module 800 may call or perform target range finder module 900. Target range finder module 900 may determine whether the target 330 of block 810 is inside or outside the range of the then-current span of the kinematic chain 305 between start index 335 and end index 340. To be outside of the range means that the length of joints between the start index 335 and end index 340 is not sufficient to allow the end index 340/effector 350 to reach the target 330. This can occur when the target 330 is too far away from the end index 340 to be reached or when the target 330 is too close to the start index 335, such that the first link after the start index 335 is longer than the remaining joints/links to the end index 340, such that the effector 350/end index 340 cannot reach back to the target 330 (this is described in greater detail, further herein).

If outside of range or equivalent at decision block 900A, at block 900B kinematic chain solver module 800 may obtain from target range finder module 900 output such as a derived target location, wherein the derived target location brings the target 330 within the range of the length of joints between the start index 335 and end index 340, wherein the derived target may be used on a subsequent processing round as a corrected range position. Target range finder module 900 may also call one of maximum range finder module 1200 or minimum range finder module 1300 and determine location coordinates for the portion of the kinematic chain 305 between the (then-current) start index 335 and end index 340. This is possible because, when the target is outside of the range of the portion of the kinematic chain 305 between the (then-current) start index 335 and end index 340, that portion will form a straight line toward or in relation to the target 330 which cannot be reached (when the target is too close, the portion of the kinematic chain 305 between the (then-current) start index 335 and end index 340 overlaps with itself trying to reach the target 330, though still in a straight line in relation to the target 330).

If in range or equivalent at decision block 900A, at block 815, kinematic chain solver module 800 may place the effector 350 on the target 330 of block 810, if any.

At block 1000, kinematic chain solver module 800 may call or perform backward solver module 1000 to determine location coordinates of mid-joints between start index 335 and end index 340, working "backward" (or in the inverse kinematic direction), from the end index 340 to the start index 335.

Output from backward solver module 1000 may comprise mid-joint locations, P'_i. Output from backward solver module 1000 may further comprise an invalid joint flag; the invalid joint flag may be in relation to a joint adjacent to the start index 335, e.g. in relation to P_1. As discussed further herein, the invalid joint flag may be produced if backward solver module 1000 cannot solve a nearest new position for a joint based on a subspace for the joint, if the mid-joint is a joint adjacent to the start index 335, e.g. in relation to P_1, and or if link verification (to confirm the lengths of links between joints) produces an error.

At block 820, kinematic chain solver module 800 met set the (then-current) mid-joint locations according to the output of backward solver module 1000.

At decision block 825, kinematic chain solver module 800 may determine if an invalid joint flag has been set, such as by backward solver module 1000.

If affirmative or equivalent, at block 1100, kinematic chain solver module 800 may call or perform forward solver module 1100, using the mid-joint locations of block 820.

At decision block 830, kinematic chain solver module 800 may determine if one or more relatively rare conditions have occurred, such a continued presence of an invalid joint flag, if indirect root motion is allowed, if there is motion of a 2-joint segment of kinematic chain 305 (in which case a subspace cannot be found for a mid-joint), or for a special non-disk scenario (see block 1035 of backward solver module 1000 or block 1130 of forward solver module 1100). Indirect root motion may be a circumstance in which the root 345, instead of being fixed, is allowed to be "dragged" by the kinematic chain 305. This may be a setting allowed by a user or another process.

If affirmative or equivalent at decision block 830, at block 1400, kinematic chain solver module 800 may call or perform direct solver module 1400 with respect to a joint of block 830 which needs to be directly solved (without use of a subspace of a mid-joint).

If negative or equivalent at decision block 830, at block 835, kinematic chain solver module 800 may update location coordinates for the joints/links between the then-current start index 335 and end index 340.

At done block 899, kinematic chain solver module 800 may conclude or return to a process which may have called it.

Figure 9:
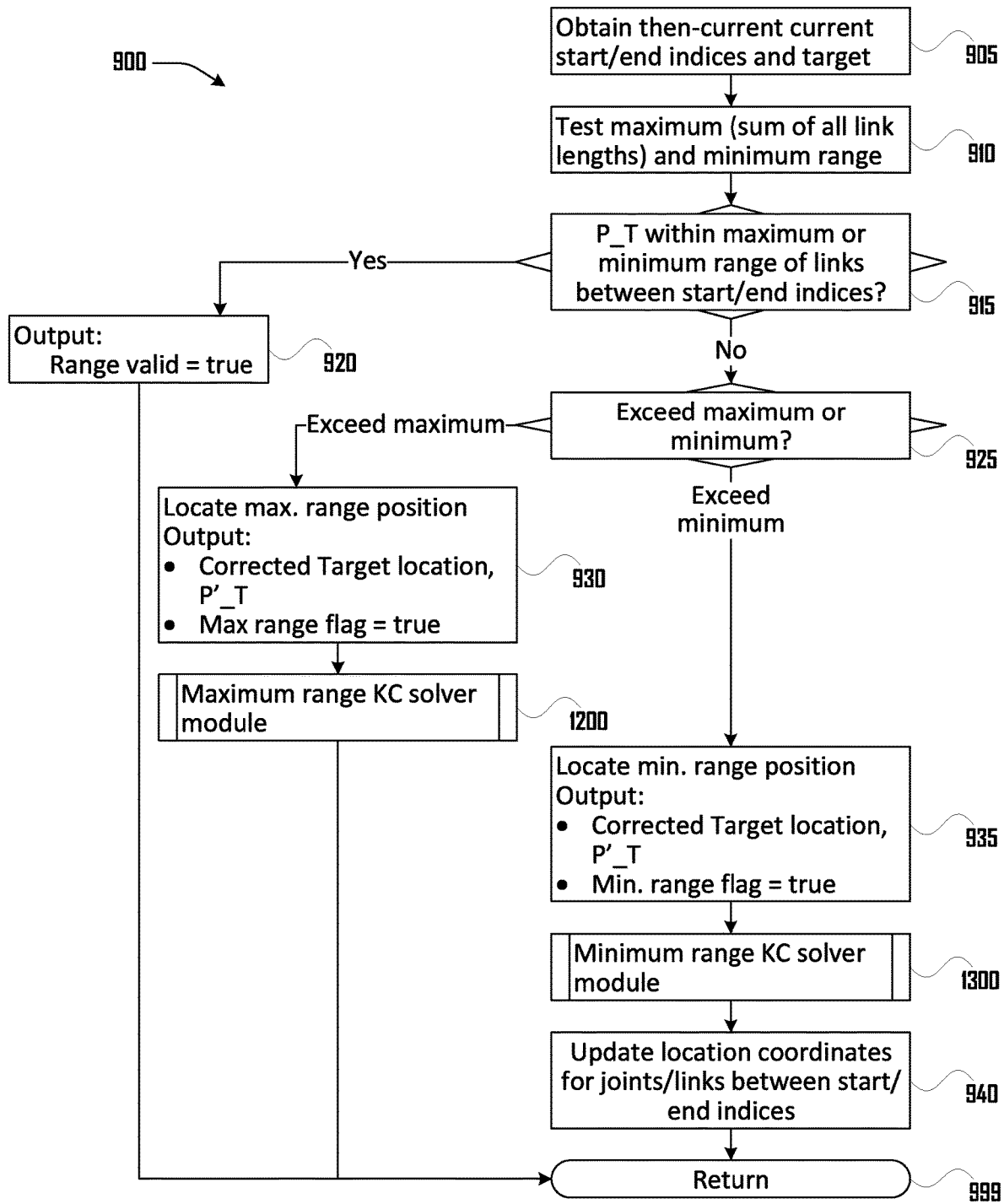
FIG. 9 is a flow diagram illustrating an example of a method performed by a target range finder module, according to some embodiments.

FIG. 9 is a flow diagram illustrating an example of a method performed by target range finder module 900, according to some embodiments. Target range finder module 900 may be performed by, for example, inverse kinematics computer 200. Target range finder module 900 is optional and may be performed to improve efficiency when the target has exceeded the maximum or minimum range of kinematic chain 305. If target range finder module 900 is not performed, backward solver module 1000 and forward solver module 1100 can still be performed notwithstanding that the target may be out of range.

At block 905, target range finder module 900 may obtain locations of the (then-current) start index 335, root, P_R, and end index 340, e.g., of effector 350, and of target, P_T, and the lengths of links between start index 335 and end index 340, d_0, d_1, . . . d_i and may test the maximum range, such as according to the sum of all link lengths, and minimum range of the joints and links between start index 335 and end index 340, relative to the target 330. The minimum range may be understood in terms of whether the link adjacent to the start index 335, e.g. the root link, is longer than the sum of remaining links. When this is the case, the end effector 350 does not have enough range to reach back across the root link to reach the target 330. Said another way, in this case the target 330 may be set in the space between the root 345 and the space accessible to the end effector 350, where the end effector 350 is separated from the root 345 by the root link (the link adjacent to the start index 335). Thus, while the maximum range may be the sum of all link lengths, the minimum range may be the root link, d_0 (or the link adjacent to the start index 335), minus the sum of all other links.

At decision block 915, target range finder module 900 may determine whether target, P_T, is within the maximum or minimum range of the span of the kinematic chain 305 between and including start index 335 and end index 340.

If negative or equivalent at decision block 915, at decision block 925, target range finder module 900 may determine whether the maximum or minimum range was exceeded.

If at decision block 925 the minimum range was exceeded, at block 635, target range finder module 900 may locate the minimum range position of the end index 340, may output a corrected target location P'_T, and may set a minimum range flag to true. The corrected target location may be determined according to a direction between the target and the start index 335 (e.g. the root 345), multiplied by the minimum range (e.g. the root link, d_0, minus the sum of all other links).

At block 1300, triggered by the minimum range flag, target range finder module 900 may call minimum range solver module 1300 to determine locations of joints between start index 335 and end index 340 when target, P_T, is not within the minimum range of joints between start index 335 and end index 340. In sum, with joints between start index 335 and end index 340 forming a straight line between start index 335 and the target 330, with the joints and links after the link adjacent to the start index 335 being doubled back over the link adjacent to the start index 335.

If exceed maximum or equivalent at decision block 925, at block 930 target range finder module 900 may locate the maximum range position of end index 340, e.g. of end effector 350, and may output a corrected target location, P'_T at such location, and a maximum range flag.

At block 1200, triggered by the maximum range flag, target range finder module 900 may call maximum range solver module 1200 to determine locations of joints between start index 335 and end index 340 when target, P_T, is beyond the maximum range of kinematic chain 305. In sum, with joints between start index 335 and end index 340 forming a straight line from start index 335 to or toward the target 330.

At block 940, target range finder module 900 may update the location coordinates for joints and links between start index 335 and end index 340.

At done block 999, target range finder module 900 may conclude or return to a process which may have called it.

Figure 10:
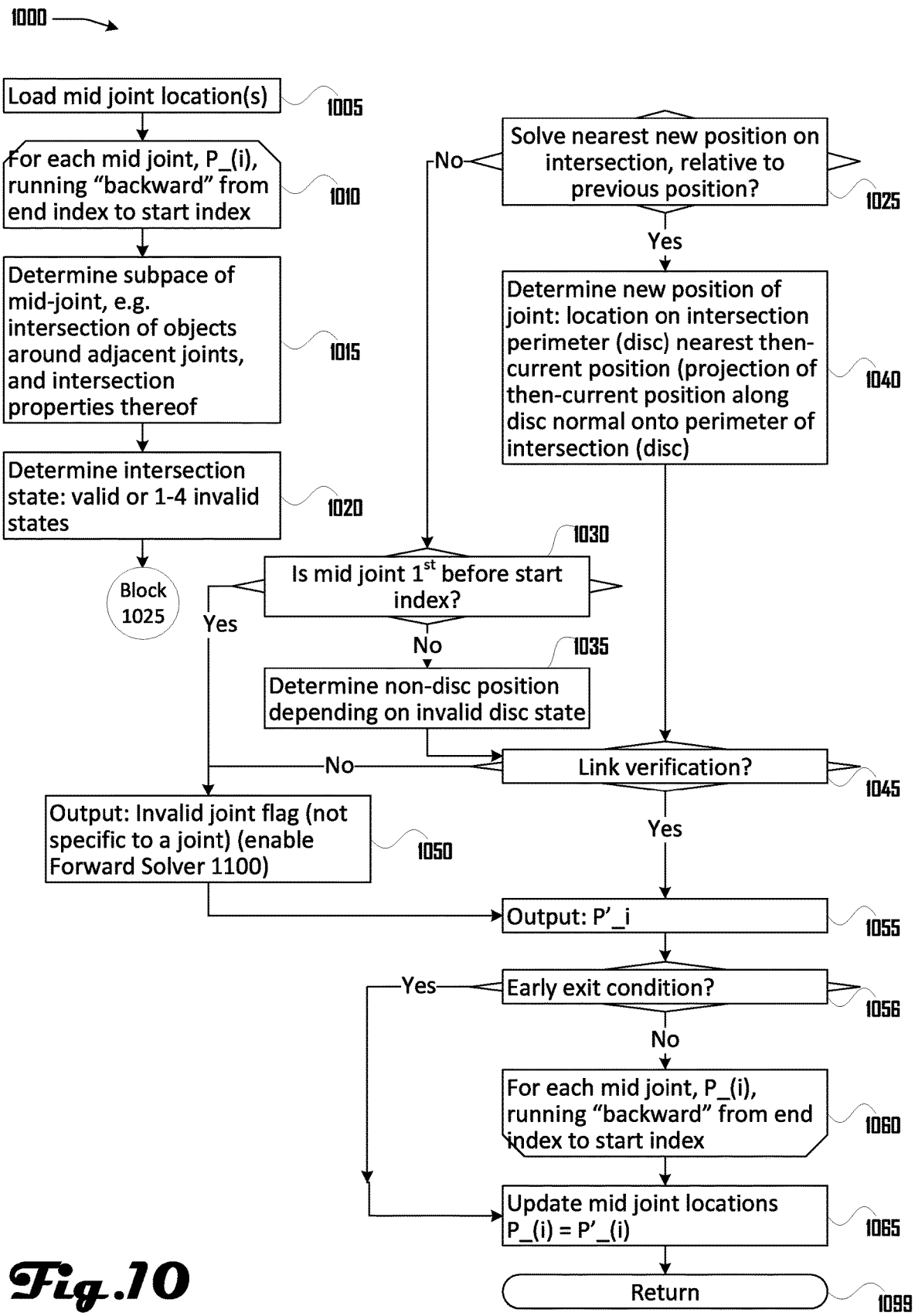
FIG. 10 is a flow diagram illustrating an example of a method performed by a backward solver module, according to some embodiments.

FIG. 10 is a flow diagram illustrating an example of a method performed by backward solver module 1000, according to some embodiments. Backward solver module 1000 may be performed by, for example, inverse kinematics computer 200.

At block 1005, backward solver module 1000 may obtain or load mid-joint locations, between the (then-current) start index 335 and end index 340; e.g. for kinematic chain comprising joints P_0 to P_n, where start index 335 is root 345 or P_0 and end index 340 is effector 350 or P_n, mid-joints P_1, P_2, . . . P_n−1.

Opening loop block 1010 to closing loop block 1070 may iterate over all mid-joints, running "backward" or in the inverse direction from end index 340 to start index 335.

At block 1015, backward solver module 1000 determine a subspace of the (then-current) mid-joint; the subspace may be determined according to an intersection of objects around adjacent joints of the (then-current) mid-joint. Backward solver module 1000 may determine such objects according to lengths of links projecting from said adjacent joints to the then current mid-joint. Two such objects may intersect, the intersection of two such objects may form a point, a disk, or may be undefined, e.g. may be undefined such as when there is no intersection due to distance apart, where the intersecting objects are coincident, or when one intersecting object is contained within another so there is no intersection. The intersection may also be referred to herein as a "disk," even though in some cases the disk may be a point or may not exist. The perimeter of the intersection of such objects is the subspace of the (then-current) mid-joint. The subspace may further be indeterminate or ambiguous when the projection of the input position (the last position of a mid-joint being solved for) along the disk normal direction (a direction perpendicular to the plane of the intersection) aligns with the disk center, so that no position on the disk is closest to the input position and so that no disk placement can be determined (as described further herein).

At block 1015, backward solver module 1000 may further determine properties of such subspace (e.g. properties of a disk), such as a center, radius, and normal direction or orientation of the subspace. The normal direction or orientation is perpendicular to a surface of the subspace (e.g. perpendicular to a surface of the disk) and toward the neighboring joint in the direction that the solver is operating. E.g. if backward solver module 1000 is solving for mid-joint P_3 in the "backward" (or inverse kinematic) direction toward P_2, the normal direction of the intersection (or disk) is perpendicular to the intersection surface, pointing toward P_2.

At block 1020, backward solver module 1000 may determine a state of the subspace. The state of the disk may be, for example, one of four invalid states or one valid state. The four invalid states may be as follows: i) no intersection because the objects or spheres are too far apart to intersect ("type external"); ii) the intersecting objects or spheres are coincident ("type coincident"); iii) one intersecting object or sphere is contained within another so there is no intersection ("type internal"); or iv) when the input position of the then-current joint aligns with the disk center so that no disk placement can be derived ("type aligned").

At decision block 1025, backward solver module 1000 may determine whether it can solve a new position on the disk for the then-current joint. This determination may be made based on the disk state determined at block 1020 and whether the disk is in the valid state. When the disk is in the valid state, backward solver module 1000 may determine it can solve a new position on the disk for the then-current joint.

If affirmative or equivalent at decision block 1025, at block 1040 backward solver module 1000 may determine the next position of the then-current mid-joint in the subspace, e.g. on the intersection of the objects, e.g. on the disk. The determination may be relative to the then-current mid-joint (the position of the mid-joint before it is moved during a current iteration of kinematic chain structure manager module 600) and may be to place the mid-joint on the subspace in a position closest to the then-current position of the (then-current) mid-joint. This may be accomplished by projecting the then-current position of the then-current mid-joint along a vector onto the disk, with a direction defined by the normal direction of the subspace or disk (as discussed herein, the "normal direction" being perpendicular to the plane of the subspace or disk). For valid disk states, this projection should be the correct length for the link.

If negative or equivalent at decision block 1025, at decision block 1030 backward solver module 1000 may determine whether the index position, i, of the then-current mid-joint is immediately adjacent to start index 335 or root 345, P_0, e.g. whether it is 1.

If negative or equivalent at decision block 1030, at block 1035 backward solver module 1000 may determine a non-disk position for the mid-joint, based on the invalid disk state. In the following discussion regarding determination of the non-disk position for the mid-joint, the "origin" and the "link" is with respect to the adjacent joint that the current mid-joint is being solved from. For example, for backward solver module 1000, when solving for mid-joint P_3, the "origin" is joint P_4 (the adjacent joint that P_3 is being solved from) and the "link" is d_3, between P_3 and P_4. Values for the "origin" joint, P_4 in this example, are the determined values of P_4 in the then-current iteration across the joints in the kinematic chain, though before such joints have been moved. For example, in the then current iteration of kinematic structure manager module 600 across all the links between P_r (the root, also referred to as P_0) and P_n (the effector), joint P_4 would have been processed, producing new position P'_4 for joint P_4, though kinematic structure manager module 600 has not finished processing all of the joints and has not moved the kinematic chain at block 645. Thus, the "origin" values for P_4 which are used with respect to P_3 (in this example, in which processing of P_3 produces an invalid disk state) are the determined-but-not-implemented values P'_4, for joint P_4. This discussion applies to forward solver module 1100, as well, though For invalid disk state type coincident, backward solver module 1000 may use the input P_i to determine direction, P'_i equal to a unit vector from origin to input P_i, multiplied by the link, plus the origin.

For invalid disk state type aligned, backward solver module 1000 may use the input P_i to determine direction, P'_i equal to a unit vector from origin to input P_i, multiplied by the link, plus the origin.

For invalid disk state type external or type internal, a direction is determined according to a line drawn between adjacent joints of the then-current mid-joint, multiplied by the link, plus the origin.

At decision block 1045, backward solver module 1000 may determine whether links in the system can be verified. Link verification determines whether the links have a length allowed by kinematic chain 305, within an error margin or epsilon.

If negative or equivalent at decision block 1045, at block 735 backward solver module 1000 may output an invalid P'_1 flag, which may enable forward solver module 1100.

If affirmative or equivalent at decision block 1045, at block 1055 backward solver module 1000 may output an updated then current mid-joint location, P'_i.

At decision block 1056, backward solver module 1000 may determine whether an early exit condition has occurred; an early exit condition may be, for example, identifying that a joint or portion of a kinematic chain has not moved since a previous iteration.

At block 1065, backward solver module 1000 may update the then-current mid-joint location P_i to equal P'_i.

At done or return block 1099, backward solver module 1000 may conclude and or may return to a module which may have called it.

Figure 11:
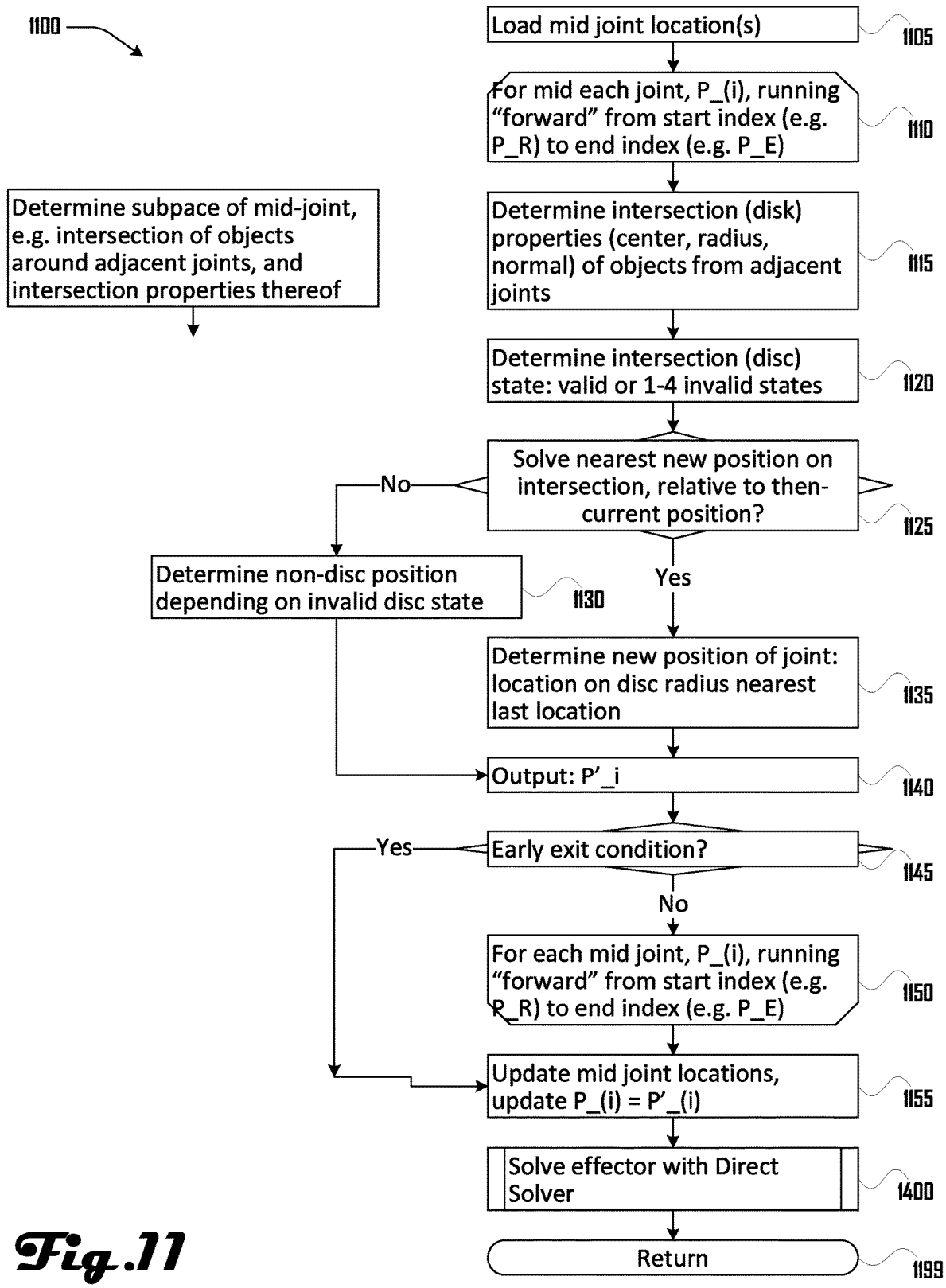
FIG. 11 is a flow diagram illustrating an example of a method performed by a forward solver module, according to some embodiments.

FIG. 11 is a flow diagram illustrating an example of a method performed by forward solver module 1100, according to some embodiments. Forward solver module 1100 may be performed by, for example, inverse kinematics computer 200.

At block 1105, forward solver module 1100 may obtain or load then-current mid-joint locations, e.g., P_1, P_2, . . . P_n−1, as may have been updated by backward solver module 1000.

Opening loop block 1110 to closing loop block 1150 may iterate over all joints, P_(i), running "forward" from start index 335, e.g. root, P_R, to end effector, P_E.

At block 1115, forward solver module 1100 may determine a subspace of the (then-current) mid-joint; the subspace may be determined according to an intersection of objects around adjacent joints of the (then-current) mid-joint; forward solver module 1100 may determine such objects according to lengths of links projecting from said adjacent joints to the then current mid-joint. Two such objects may intersect, forming the subspace for the mid-joint. The subspace may form a point, a disk, or may be undefined, e.g. may be undefined such as when there is no intersection due to distance apart, where the intersecting objects are coincident, when one intersecting object is contained within another so there is no intersection. The subspace may further be indeterminate or ambiguous when the projection of the input position (the then-current position of the then-current mid-joint) aligns with the disk center, so that no disk placement direction can be determined.

At block 1115, backward solver module 1000 may further determine properties of such subspace (e.g. properties of a disk), such as a center, radius, and normal direction or orientation of the subspace. The normal direction or orientation is perpendicular to a surface of the subspace (e.g. perpendicular to a surface of the disk) and to the neighboring joint in the direction that the solver is operating. E.g. for forward solver module 1100, solving for P_3, the normal direction is toward P_4.

At block 1120, forward solver module 1100 may determine a state of the disk. The state of the disk may be, for example, one of four invalid states or the one valid state. The four invalid states may be as follows: i) no intersection because the objects or spheres are too far apart to intersect ("type external"); ii) the intersecting objects or spheres are coincident ("type coincident"); iii) one intersecting object or sphere is contained within another so there is no intersection ("type internal"); or iv) when projection of the input position aligns with the disk center so that no disk placement can be derived ("type aligned").

At decision block 1125, forward solver module 1100 may determine whether it can solve a new position on the disk for the then-current joint. The determination may be relative to then-current position of the then-current mid-joint and may be to place the mid-joint on the disk in a new position closest to the then-current position of the then-current mid-joint.

If affirmative or equivalent at decision block 1125, at block 1135 forward solver module 1100 may determine the new position of the then-current mid-joint in the subspace, e.g. on the disk. The determination may be relative to the then-current position of the then-current mid-joint and may be to place the mid-joint in the subspace in a new position closest to the then-current position of the (then-current) mid-joint.

If negative or equivalent at decision block 1125, at block 1130 forward solver module 1100 may determine a non-disk position for the mid-joint, based on the invalid disk state. In the following discussion regarding determination of the non-disk position for the mid-joint, the "origin" and the "link" is with respect to the adjacent joint that the current mid-joint is being solved from. For example, for forward solver module 1100, when solving for mid-joint P_3, the "origin" is joint P_2 and the "link" is d_2, between P_2 and P_3.

For invalid disk state type coincident, forward solver module 1100 may use the input P_i to determine direction, P'_i equal to a unit vector from origin to input P_i, multiplied by the link, plus the origin.

For invalid disk state type aligned, forward solver module 1100 may use the input P_i to determine direction, P'_i equal to a unit vector from origin to input P_i, multiplied by the link, plus the origin.

For invalid disk state type external or type internal, a direction is determined according to a line drawn between adjacent joints of the then-current mid-joint, multiplied by the link, plus the origin.

If affirmative or equivalent at decision block 11, at block 1135 forward solver module 1000 may determine the new position of the then-current mid-joint in the subspace, e.g. on the disk. The determination may be relative to then-current position of the then-current mid-joint and may be to place the mid-joint in the subspace in a new position closest to the then-current position of the (then-current) mid-joint.

If affirmative or equivalent at decision block 1025, at block 1040, at block 1055 forward solver module 1100 may output an updated then-current mid-joint location, P'_i.

At block 1145, forward solver module 1000 may determine whether an early exit condition has occurred; an early exit condition may be, for example, identifying that a joint or portion of a kinematic chain has not moved since a previous iteration.

At closing loop block 1150, forward solver module 1100 may return to opening loop block 1110 to iterate over the next mid-joint running forward.

At block 1155, forward solver module 1100 may update the then-current mid-joint location P_i to equal P'''_i, the new location or new position.

At block 1140, forward solver module 1100 may call or perform direct solver module 1400, e.g. to solve any invalid joints.

At done or return block 1199, forward solver module 1100 may conclude and or may return to a module which may have called it.

Figure 12:
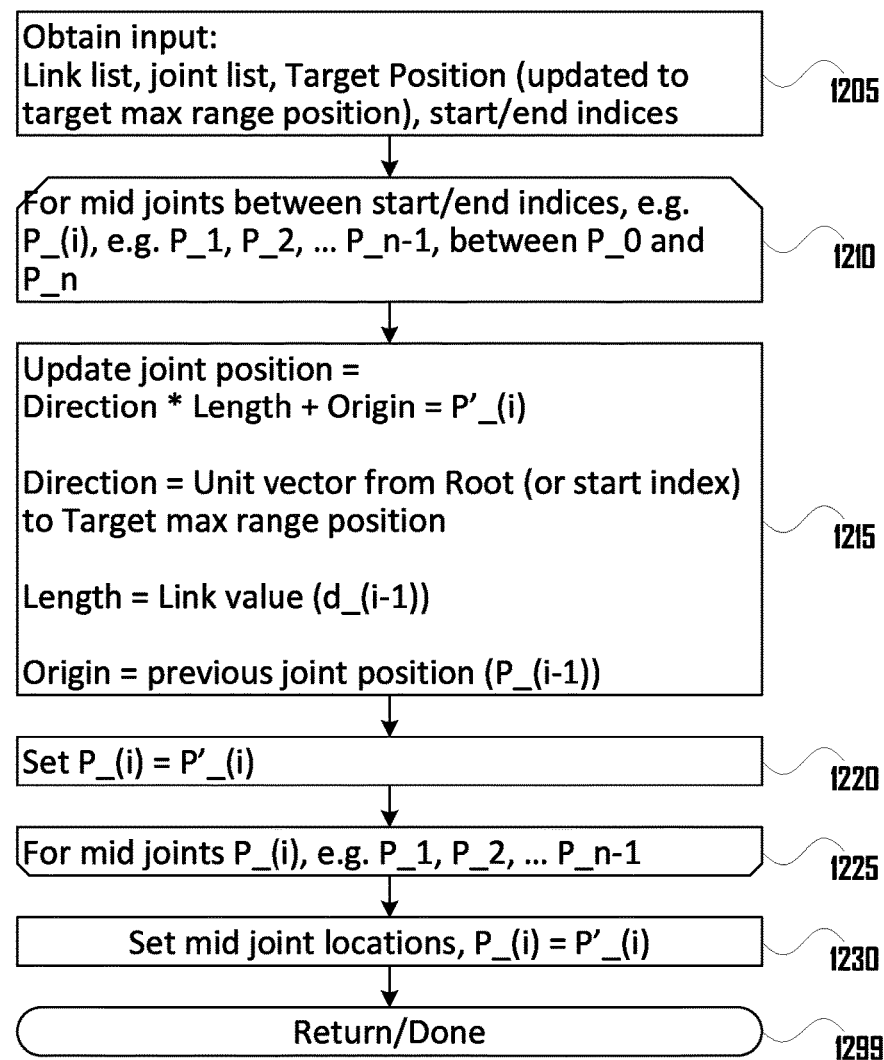
FIG. 12 is a flow diagram illustrating an example of a method performed by a maximum range solver module, according to some embodiments.

FIG. 12 is a flow diagram illustrating an example of a method performed by maximum range module 1200, according to some embodiments. Maximum range module 1200 may be performed by, for example, inverse kinematics computer 200.

At block 1205, maximum range module 1200 may obtain input comprising a list of links, joints between start index 335 and end index 340, target position P_T, total number of joints, and n, total number of links.

Opening loop block 1210 to closing loop block 1225 may iterate over each of the mid-joints.

At block 1215, maximum range module 1200 may determine the location of each mid-joint. The location of each mid-joint may be determined by multiplying the direction by the length of the then-current link, plus the origin; in the foregoing, "direction" is equal to a unit vector from the root to the target, unless the unit vector has a value of zero, in which case a unit vector from the root to P_1 may be used to determine the direction; in which "length" is equal to the link value of the then-current link, e.g. d_i−1; and the origin is the previous joint position, e.g. P_i−1. This process places kinematic chain 305 in a line, stretching from the root toward the target.

At block 1220, maximum range module 1200 may set the link positions P_i equal to the determined positions from block 1215, P'_i.

At closing loop block 1225, maximum range module 1200 may return to iterate over remaining mid-joints, if any.

At block 1230, maximum range module 1200 may set the mid-joint locations P_i equal to the mid-joint locations determined at block 1215 and set at block 1220.

At done or return block 1299, maximum range module 1200 may conclude and or return to a process which may have called it.

Figure 13:
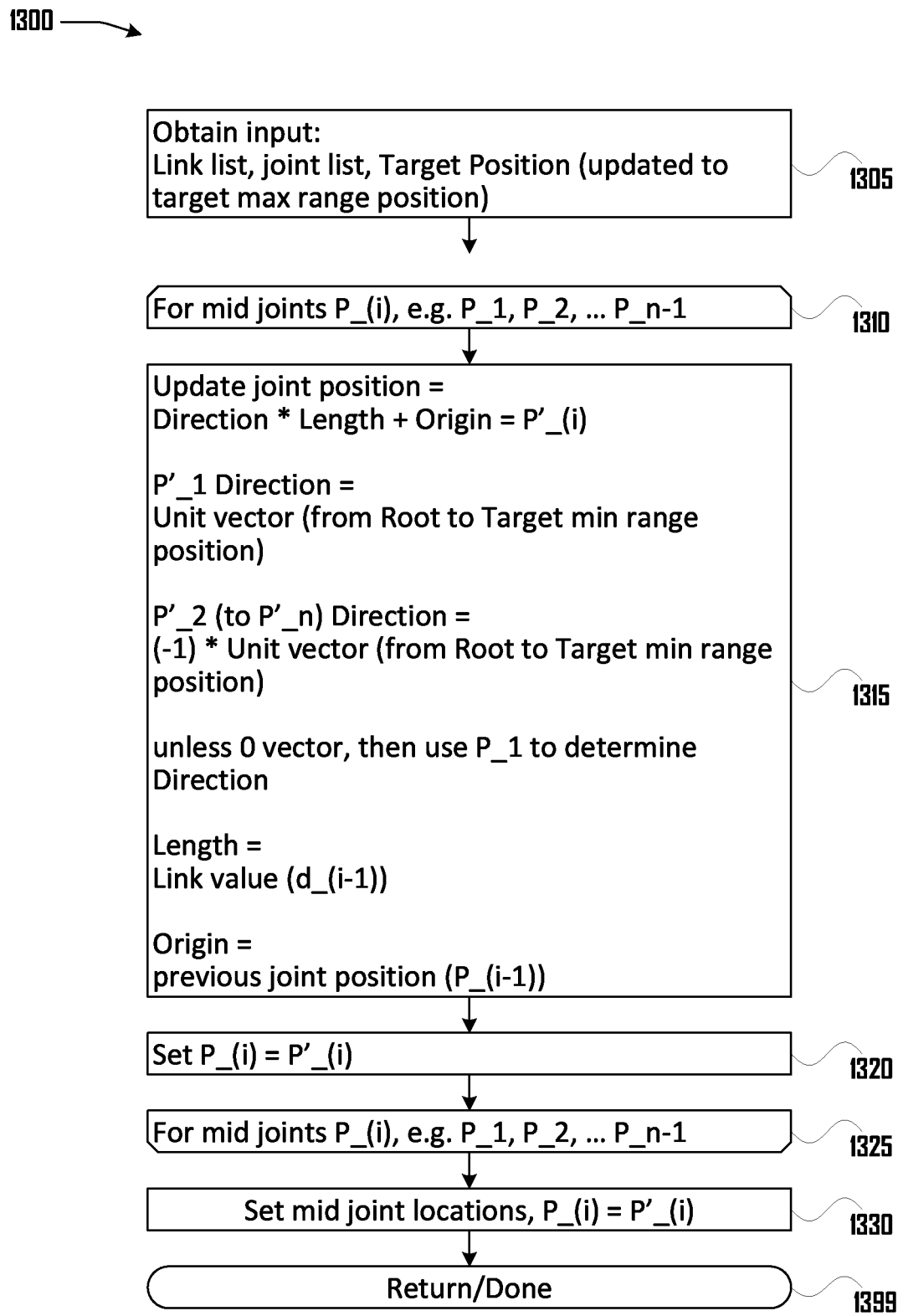
FIG. 13 is a flow diagram illustrating an example of a method performed by a minimum range solver module, according to some embodiments.

FIG. 13 is a flow diagram illustrating an example of a method performed by minimum range module 1300, according to some embodiments. Minimum range module 1300 may be performed by, for example, inverse kinematics computer 200.

At block 1305, minimum range module 1300 may obtain input comprising a list of links and joints between start index 335 and end index 340, target position P_T, total number of joints, and n, total number of links.

Opening loop block 1310 to closing loop block 1325 may iterate over each of the mid-joints.

At block 1315, minimum range module 1300 may determine the location of each mid-joint. The location of each mid-joint may be determined by multiplying the direction by the length of the then-current link, plus the origin. However, unlike maximum range module 1200, in minimum range module 1300, the "direction" for mid-joint P_1 and the root link, is equal to a unit vector from the root to the target minimum range position while for all other mid-joints and the end effector P_n, the direction is −1 times the unit vector from the root to the target minimum range position, unless the unit vector has a value of zero, in which case a unit vector from the root to P_1 may be used to determine the direction; in which "length" is equal to the link value of the then-current link, e.g. d_i−1; and the origin is the previous joint position, e.g. P_i−1. This process places kinematic chain 305 between start index 335 and end index 340 in a straight line oriented between the root and the target, with the root link pointing past the target, the P_1 joint at the end of the root link, and the remaining mid-joints pointing in toward the target along the line of the root link.

At block 1320, minimum range module 1300 may set the link positions P_i equal to the determined positions from block 1315, P'_i.

At closing loop block 1325, minimum range module 1300 may return to iterate over remaining mid-joints, if any.

At block 1330, minimum range module 1300 may set the mid-joint locations P_i equal to the mid-joint locations determined at block 1315 and set at block 1320.

At done or return block 1399, minimum range module 1300 may conclude and or return to a process which may have called it.

Figure 14:
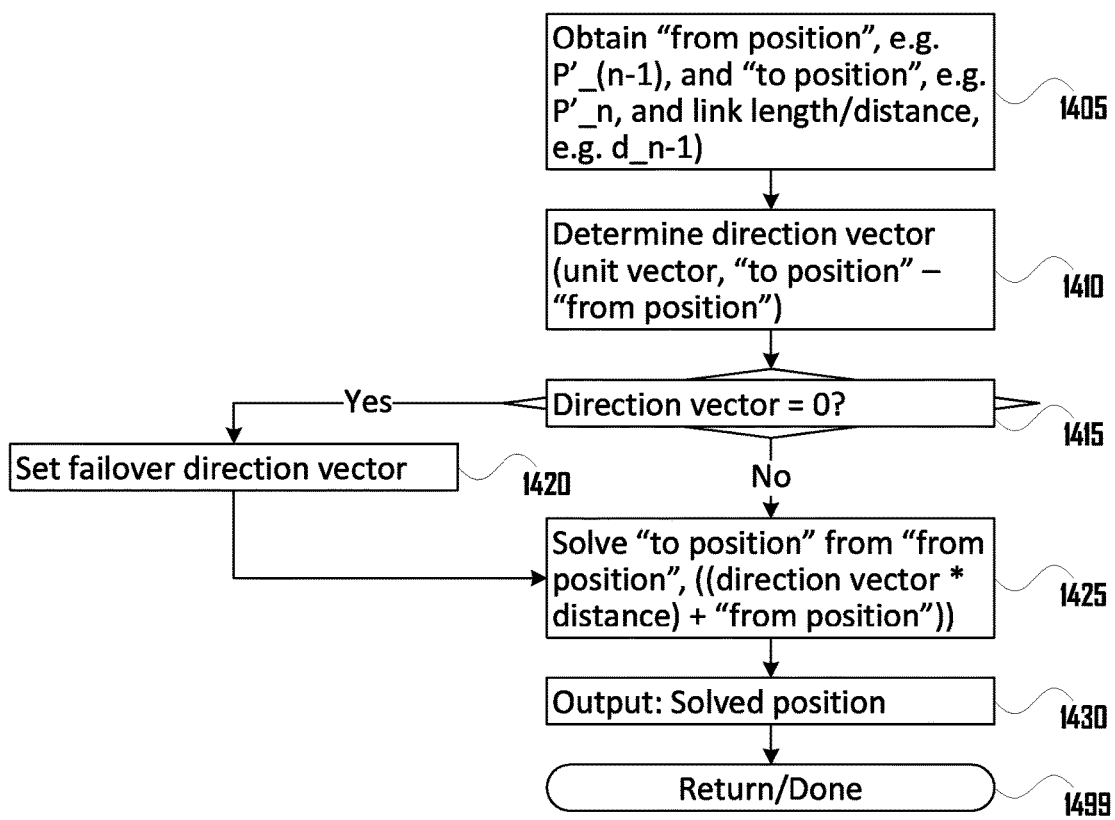
FIG. 14 is a flow diagram illustrating an example of a method performed by a direct solver module, according to some embodiments.

FIG. 14 is a flow diagram illustrating an example of a method performed by direct solver module 1400, according to some embodiments. Direct solver module 1400 may be performed by, for example, inverse kinematics computer 200. In overview, direct solver module 1400 may, such as during performance of kinematic chain solver module 800, solve the position of individual joints when a subspace formed by an intersection of objects projecting from neighboring joints cannot be determined.

At block 1405, direct solver module 1400 may obtain a "from position", e.g. a position of a joint before the link in the solving direction, and a "to position", and a link length or distance between such joints. E.g. if the effector 350, P_n, is being solved, the "from position" is P_n−1 and the link length is d_n−1.

At block 1410, direct solver module 1400 may determine a direction vector for the joint to be solved; e.g. a unit vector determined by subtracting the from the to position the from position.

At decision block 1415, direct solver module 1400 may determine if the direction vector is zero.

If affirmative or equivalent at decision block 1415, at block 1420, direct solver module 1400 may set a failover direction vector. The failover direction vector may be a randomly assigned direction vector.

At block 1425, direct solver module 1400 may solve the "to position" from the "from position"; e.g. as the direction vector of block 1410 or block 1420 multiplied by the length plus the "from position".

At block 1430, direct solver module 1400 may output the solved position.

At done or return block 1499, direct solver module 1400 may conclude or may return to a process which may have called it.

Figure 15:
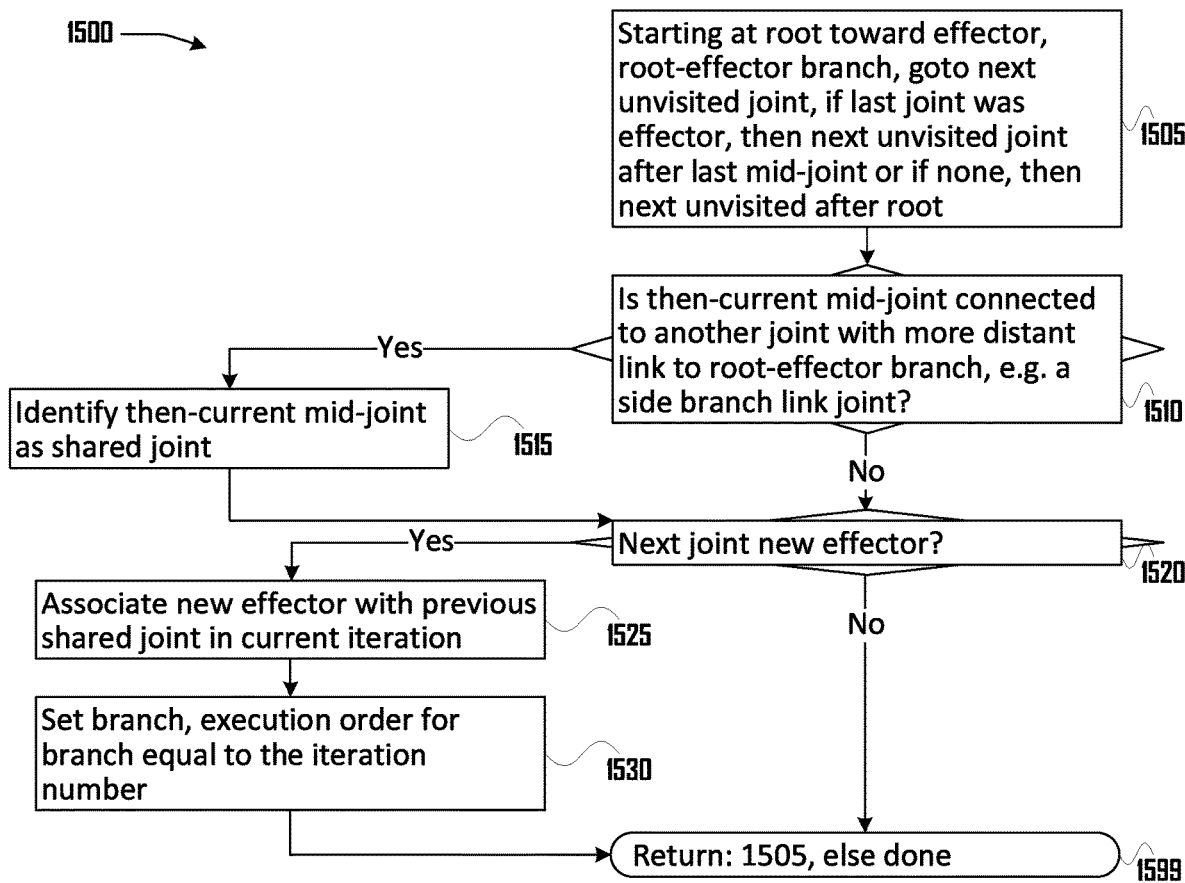
FIG. 15 is a flow diagram illustrating an example of a method performed by an execution order module, according to some embodiments.

FIG. 15 is a flow diagram illustrating an example of a method performed by execution order module 1500, according to some embodiments. Execution order module 1500 may be performed by, for example, inverse kinematics computer 200. In overview, execution order module 1500 may determine and output branch 310 records, wherein the branch 310 records indicate a shared joint which starts each branch and an effector or terminal joint which ends each branch in kinematic chain 305 (these are not always the same as start index 335 and end index 340), an execution order among branches, where the execution order may be stored as one or more execution order 360 records, and may output these shared joints as one or more shared joint 325 records.

At block 1505, execution order module 1500 may start at root 345, moving toward an effector 350 associated with root 345, e.g. effector 350 associated with root 345 by a user, by another process, and the like, and go to the next unvisited joint; if the last visited joint was an effector 350, then next unvisited joint after the last mid-joint or if none then next unvisited joint after root 345.

At decision block 1510, execution order module 1500 may determine if the then-current mid-joint is connected to more than one other joint, e.g. connected to a joint with a more distant link to root-effector branch, e.g. a "shared joint".

If affirmative or equivalent at decision block 1510, at block 1515 execution order module 1500 may identify the then-current mid-joint as a shared joint and store it in a shared joint 325 record.

At decision block 1520, execution order module 1500 may determine if the next joint is a new effector 345.

If affirmative or equivalent at decision block 1520, at block 1525 execution order module 1500 may associate the new effector with the previous shared joint in the current iteration.

At block 1530 execution order module 1500 may set joints between the previous mid-joint and the new end effector as a branch and set the execution order 360 as the then-current iteration number.

At return or done block 1599, execution order module 1500 may return to 1505 to go to the next unvisited joint. If there are no more unvisited joints, then at done or return block 1599, execution order module 1500 may conclude or may return to a process which may have called it.

Figure 16:
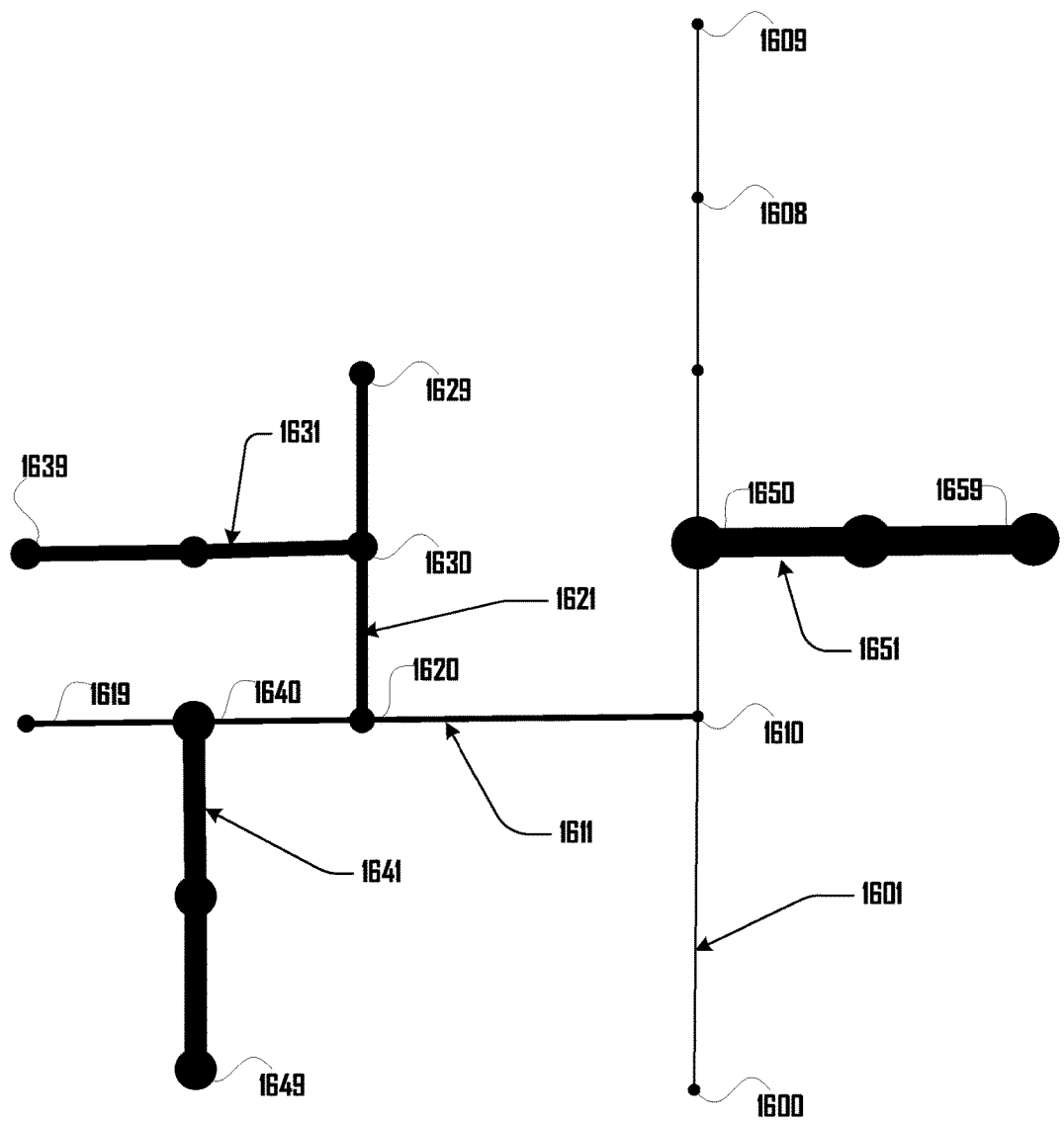
FIG. 16 illustrates an example of a kinematic chain with branches.

FIG. 16 illustrates an example of a kinematic chain with branches 1699. In FIG. 16, lines with a consistent line-weight are a branch.

In FIG. 16, joint 1600 is root 1600 and first effector 1609 is associated with root 1600, forming a first branch in the execution order.

In FIG. 16, number 1610 indicates first shared joint 1610, encountered when traversing from root 1600 to first effector 1609; first shared joint 1610 is associated with second effector 1619, forming a second branch in the execution order.

In FIG. 16, number 1620 indicates second shared joint 1620, encountered when traversing from first shared joint 1610 to effector 1619; second shared joint 1620 is associated with third effector 1629, forming a third branch in the execution order.

In FIG. 16, number 1630 indicates third shared joint 1630, encountered when traversing from second shared joint 1620 to effector 1629; third shared joint 1630 is associated with fourth effector 1639, forming a fourth branch in the execution order.

In FIG. 16, number 1640 indicates fourth shared joint 1640, encountered when traversing from first shared joint 1610 to effector 1619; fourth shared joint 1640 is associated with fifth effector 1649, forming a fifth branch in the execution order.

In FIG. 16, number 1650 indicates fifth shared joint 1650, encountered when traversing from root 1600 to effector 1609; fifth shared joint 1640 is associated with fifth effector 1649, forming a sixth branch in the execution order.

As the kinematic chain in FIG. 16 is traversed by execution order module 1500, starting at root 1600, the first branch 1601 is set at root 1600, execution order module 1500 traverses to 1610, identifies 1610 as shared joint 1610, identifies second branch 1611, off of first branch at shared joint 1610; traverses to 1620, identifies 1620 as shared joint 1620 and identifies third branch 1621 at shared joint 1620; traverses toward 1630, identifies 1630 as shared joint 1630 and identifies fourth branch 1631 at shared joint 1630; traverses toward 1639, identifies 1639 as effector 1639 associated with shared joint 1630, and returns to shared joint 1630. At shared joint 1630, execution order module 1500 traverses to 1629, identifies 1629 as effector 1629 associated with shared joint 1620 and third branch 1621, returns to 1640, identifies 1640 as shared joint 1640 and sets fifth branch 1641 at shared joint 1640, traverses toward 1649, identifies 1649 as effector 1649 associated with shared joint 1640 and fifth branch 1641; returns to shared joint 1640, traverses toward 1619, identifies 1619 as effector 1619 associated with shared joint 1610 and second branch 1611. Returns to 1650, identifies 1650 as shared joint 1650 and sets sixth branch 1651, traverses toward 1659, identifies 1659 as effector 1659 associated with shared joint 1650 and sixth branch 1651. If necessary, traverses toward 1609, identifies 1609 as effector 1609 associated with root 1600 and first branch 1601.

The execution order, first for alpha branches, and then for beta branches, is first branch 1601, second branch 1611, third branch 1621, fourth branch 1631, fifth branch 1641, sixth branch 1651.

As used herein, "closer," when referring to joints, refers not to physical proximity but to proximity in terms of fewer joints separating the referenced joints.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Logical steps described in flowcharts and the like herein may be re-ordered to accomplish a similar effect.

Following are non-limiting examples:

Example 1. An apparatus for inverse kinematics, comprising: a computer processor and a memory; and an inverse kinematic module in the memory to perform a transformation of a kinematic chain, wherein the kinematic chain comprises a root, an effector, and at least a first mid-joint, wherein the first mid-joint is between the root and the effector, wherein the transformation is to move the effector from a starting location to or toward ("to") a target location, wherein to perform the transformation of the kinematic chain to move the effector from the starting location to the target location, the inverse kinematic module is to determine a subspace of the first mid-joint, and is to perform the transformation of the kinematic chain according to the subspace of the first mid-joint.

Example 2. The apparatus according to Example 1 or another claim or example herein, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and wherein the inverse kinematic module is to determine a first object around the effector-proximate joint and a second object around the root-proximate joint, is to determine an intersection of the first object and the second object ("intersection"), and is to determine the subspace of the first mid-joint according to a perimeter of the intersection.

Example 3. The apparatus according to Example 2 or another claim or example herein, wherein a location of the first object around the effector-proximate joint is based on a new position for the effector-proximate joint and a location of the second object around the root-proximate joint is based on a then-current position of the root-proximate joint and wherein to perform the transformation of the kinematic chain according to the subspace of the first mid-joint, the inverse kinematics module is to move the effector to the target location, and determine a new position for the first mid-joint on the perimeter of the intersection.

Example 4. The apparatus according to Example 3 or another claim or example herein, wherein to determine the new position for the first mid-joint on the perimeter of the intersection, the inverse kinematics module is to determine the new position on the perimeter of the intersection closest to a then-current position of the first mid-joint.

Example 5. The apparatus according to Example 4 or another claim or example herein, wherein the then-current position of first mid-joint is before movement of the first mid-joint to the new position.

Example 6. The apparatus according to Example 3 or another claim or example herein, wherein to determine the new position closest to the then-current position, the inverse kinematic module is to project a vector from the then-current position of the first mid-joint to the perimeter of the intersection along a normal direction of the perimeter of the intersection, wherein the normal direction is perpendicular to a plane of the perimeter of the intersection.

Example 7. The apparatus according to Example 2 or another claim or example herein, wherein the objects are defined by lengths of links between the first mid-joint and the adjacent joints of the first mid-joint.

Example 8. The apparatus according to Example 7 or another claim or example herein, wherein the objects are spheres.

Example 9. The apparatus according to Example 2 or another claim or example herein, wherein the perimeter of the intersection comprises at least one of a disk, a point, is undefined, or presents an ambiguous subspace.

Example 10. The apparatus according to Example 2 or another claim or example herein, wherein the adjacent joints of the first mid-joint comprise the effector and the root.

Example 11. The apparatus according to Example 2 or another claim or example herein, wherein the adjacent joints of the first mid-joint are a first adjacent joints of the first mid-joint, wherein the kinematic chain further comprises a second mid-joint between the first mid-joint and the effector, wherein the first adjacent joints comprise the second mid-joint and the root, and wherein second adjacent joints of the second mid-joint comprise the effector and the first mid-joint.

Example 12. The apparatus according to Example 11 or another claim or example herein, wherein the objects around adjacent joints of the first mid-joint are first objects around first adjacent joints of the first mid-joint, wherein the intersection of the first objects around the adjacent joints of the first mid-joint is a first intersection of the first objects around the first adjacent joints of the first mid-joint, wherein the subspace of the first mid-joint is a first subspace of the first mid-joint, and wherein the inverse kinematic module is to determine second objects around second adjacent joints of the second mid-joint, is to determine a second intersection of the second objects around the second adjacent joints of the second mid-joint, and is to determine a second subspace of the second mid-joint according to the second intersection of the second objects around the adjacent joints of the second mid-joint.

Example 13. The apparatus according to Example 12 or another claim or example herein, wherein the inverse kinematic module is to determine the second subspace of the second mid-joint before determining the first substance of the first mid-joint.

Example 14. The apparatus according to Example 1 or another claim or example herein, wherein the root is fixed.

Example 15. The apparatus according to Example 1 or another claim or example herein, wherein the transformation is to move the effector from a starting location toward a target location, wherein to perform the transformation of the kinematic chain according to the subspace of the first mid-joint, the inverse kinematics module is to move the effector toward the target location.

Example 16. The apparatus according to Example 1 or another claim or example herein, wherein the inverse kinematic module is to perform the transformation of the kinematic chain in an inverse direction, from the effector to the root.

Example 17. The apparatus according to Example 16 or another claim or example herein, wherein after performing the transformation of the kinematic chain in the inverse direction and prior to moving the first mid-joint, the inverse kinematic module is to detect an invalid joint and is to perform the transformation of the kinematic chain in a forward direction.

Example 18. The apparatus according to Example 17 or another claim or example herein, wherein to perform the transformation of the kinematic chain in the forward direction, the inverse kinematics module is to use locations for joints of the kinematic chain determined when performing the transformation of the kinematic chain in the inverse direction.

Example 19. The apparatus according to Example 9 or another claim or example herein, wherein the perimeter of the intersection is undefined when the adjacent joints are too far apart for the objects to intersect, when the adjacent joints are coincident, or when a first of the objects around a first of the adjacent joints is within a second of the objects around a second of the adjacent joints, and wherein the perimeter of the intersection presents the ambiguous subspace when a then-current position of the first mid-joint is along a line perpendicular to a center of the intersection.

Example 20. The apparatus according to Example 9 or another claim or example herein, wherein the perimeter of the intersection is undefined because the adjacent joints are coincident and wherein to perform the transformation of the kinematic chain according to the subspace of the first mid-joint comprises to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 21. The apparatus according to Example 9 or another claim or example herein, wherein the intersection of the objects around the adjacent joints of the first mid-joint presents the ambiguous subspace, and wherein to perform the transformation of the kinematic chain according to the subspace of the first mid-joint comprises to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 22. The apparatus according to Example 4 or another claim or example herein, wherein the new position closest to the then-current position of the first mid-joint is ambiguous when the then-current position of the first mid-joint is along a line perpendicular to a plane of the intersection.

Example 23. The apparatus according to Example 1 or another claim or example herein, wherein to perform the transformation of the kinematic chain according to the subspace of the first mid-joint of the kinematic chain, the inverse kinematic module is to determine that the target location is not within a range of the kinematic chain and is to determine a nearest in-range position toward the target location along a path to the target location, and is to perform the transformation of the kinematic chain to move the effector from the starting location to the nearest in-range position toward the target location along the path to the target location.

Example 24. The apparatus according to Example 23 or another claim or example herein, wherein the inverse kinematics module is to determine the range of the kinematic chain according to lengths of all links of the kinematic chain and wherein to perform the transformation of the kinematic chain to move the effector from the starting location to the nearest in-range position toward the target location along the path to the target location, the inverse kinematics module is to place the effector on the nearest in-range position toward the target location along the path to the target location and is to perform the transformation of the kinematic chain according to the subspace of the first mid-joint backward from the effector to the root Example 25. The apparatus according to Example 1 or another claim or example herein, wherein the inverse kinematic module is to determine that the target location is not within the range of the kinematic chain, and wherein to perform the transformation of the kinematic chain according to the subspace of the kinematic chain, the inverse kinematic module is to place all joints of the kinematic chain along a line between the root and the target location, wherein a length of the line and a plurality of spaces between the root, the first mid-joint, and the effector are determined according to lengths of respective links between the root, the first mid-joint, and the effector and wherein the effector is placed on a nearest in-range position toward the target location along a path to the target location.

Example 26. The apparatus according to Example 1 or another claim or example herein, wherein the kinematic chain comprises a branch.

Example 27. The apparatus according to Example 1 or another claim or example herein, wherein the inverse kinematic module is to traverse the kinematic chain and identify a plurality of branches of the kinematic chain, is to determine an execution order of the plurality of branches, and wherein the inverse kinematic module is to perform the transformation on the plurality of branches in the execution order.

Example 28. The apparatus according to Example 27 or another claim or example herein, wherein the inverse kinematic module is further to detect externally driven motion in a first set of branches in the plurality of branches and is to perform the transformation on the plurality of branches in the execution order first in the first set of branches and then is to perform the transformation in the execution order in any remaining branches after the first set of branches.

Example 29. The apparatus according to Example 28 or another claim or example herein, wherein externally driven motion is motion of the effector in response to motion of the target or motion of the first mid-joint, of another mid-joint, or of the root in response to direct motion provided by a user or an external process.

Example 30. The apparatus according to Example 28 or another claim or example herein, wherein the inverse kinematic module is to detect externally driven motion of a directly-moved mid-joint, wherein the directly-moved mid-joint is in a first branch in the first set of branches, the inverse kinematic module is to divide the first branch in the first set of branches into a first sub-branch and a second sub-branch, is to set a first start index and a first end index of the first sub-branch and a second start index and a second end index of the second sub-branch, wherein the first end index of the first sub-branch is the directly-moved mid-joint, the second start index of the second sub-branch is the directly-moved mid-joint, the second end index of the second sub-branch is a branch effector of the first branch in the first set of branches.

Example 31. The apparatus according to Example 27 or another claim or example herein, wherein the effector is a first effector and wherein to determine the execution order of the plurality of branches comprises to walk the kinematic chain to identify a first branch at the root, identify a first shared joint, identify a second effector, and identify a second branch between first shared joint and the second effector, wherein the execution order comprises the first branch followed by the second branch.

Example 32. The apparatus according to Example 27 or another claim or example herein, wherein to perform the transformation of the kinematic chain in the execution order comprises to perform a first transformation of a first portion of the kinematic chain controlled by a first branch in the plurality of branches followed by a second transformation of a second portion of the kinematic chain controlled by a second branch in the plurality of branches.

Example 33. The apparatus according to Example 32 or another claim or example herein, wherein to perform the transformation of the kinematic chain further comprises to determine a first start index and a first end index of the first portion of the kinematic chain controlled by the first branch and a second start index and a second end index of the second portion of the kinematic chain controlled by the second branch.

Example 34. The apparatus according to Example 33 or another claim or example herein, wherein the effector is the first effector and wherein the inverse kinematic module is to determine the first start index to be the root, and wherein the inverse kinematic module is further to determine the first end index to be the first effector, the second start index is to be a first shared joint, and the second end index to be a second effector.

Example 35. The apparatus according to Example 32 or another claim or example herein, wherein after the first transformation of the first portion of the kinematic chain, the inverse kinematic module is to lock the first portion of the kinematic chain and to then perform the second transformation of the second portion of the kinematic chain, wherein the second transformation of the second portion of the kinematic chain does not move any joint moved in the first transformation of the first portion of the kinematic chain.

Example 36. The apparatus according to Example 32 or another claim or example herein, wherein the effector is a first effector and is associated with the root, wherein the inverse kinematic module is to identify the first branch as a first set of joints between and including the root and the first effector, wherein the inverse kinematic module is to traverse the first branch from the root toward the first effector, is to identify a first shared joint, wherein the first shared joint is connected to the first branch and the second branch, wherein the first shared joint is associated with a second effector, wherein the inverse kinematic module is to identify the second branch as a second set of joints between and including the first shared joint and the second effector.

Example 37. The apparatus according to Example 36 or another claim or example herein, wherein the inverse kinematic module is to traverse the second branch from the first shared joint toward the second effector, is to identify a second mid-joint between the first mid-joint and the first effector as a second shared joint, wherein the second shared joint is associated with a third effector, and wherein the inverse kinematic module is to identify a third branch between the second shared joint and the third effector.

Example 38. The apparatus according to Example 36 or another claim or example herein, wherein to perform the transformation of the kinematic chain in the execution order comprises to perform the first transformation of the first portion of the kinematic chain controlled by the first branch, followed by the second transformation of the second portion of the kinematic chain controlled by the second branch.

Example 39. The apparatus according to Example 36 or another claim or example herein, wherein the inverse kinematic module is to complete traversal of the second branch and is to return to continue to traverse the first branch to identify the plurality of branches of the kinematic chain and to determine an execution order of the plurality of branches of the kinematic chain.

Example 40. The apparatus according to Example 27 or another claim or example herein, wherein the effector is a first effector, wherein a first branch of the plurality of branches comprises a first sequence of one or more connected joints, wherein the first sequence of one or more connected joints are between the root and the first effector, and wherein a second branch of the plurality of branches comprises a second sequence of one or more connected joints, wherein the second sequence of one or more connected joints are between a shared joint and a second effector.

Example 41. A computer implemented method for inverse kinematics, comprising: with a computer processor and a memory, performing a transformation of a kinematic chain to move the effector from a starting location to or toward ("to") a target location, wherein the kinematic chain comprises a root, an effector, and at least a first mid-joint, wherein the first mid-joint is between the root and the effector, wherein performing the transformation of the kinematic chain to move the effector from the starting location to the target location comprises determining a subspace of the first mid-joint, and performing the transformation of the kinematic chain according to the subspace of the first mid-joint.

Example 42. The method according to Example 41 or another claim or example herein, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and further comprising determining a first object around the effector-proximate joint and a second object around the root-proximate joint, determining an intersection of the first object and the second object ("intersection"), and determining the subspace of the first mid-joint according to a perimeter of the intersection.

Example 43. The method according to Example 42 or another claim or example herein, wherein a location of the first object around the effector-proximate joint is based on a new position for the effector-proximate joint and a location of the second object around the root-proximate joint is based on a then-current position of the root-proximate joint and wherein performing the transformation of the kinematic chain according to the subspace of the first mid-joint further comprises moving the effector to the target location and determining a new position for the first mid-joint on the perimeter of the intersection.

Example 44. The method according to Example 43 or another claim or example herein, wherein determining the new position for the first mid-joint on the perimeter of the intersection comprises determining the new position on the perimeter of the intersection closest to a then-current position of the first mid-joint.

Example 45. The method according to Example 44 or another claim or example herein, wherein the then-current position of first mid-joint is before movement of the first mid-joint to the new position.

Example 46. The method according to Example 43 or another claim or example herein, wherein determining the new position closest to the then-current position comprises projecting a vector from the then-current position of the first mid-joint to the perimeter of the intersection along a normal direction of the perimeter of the intersection, wherein the normal direction is perpendicular to a plane of the perimeter of the intersection.

Example 47. The method according to Example 42 or another claim or example herein, wherein the objects are defined by lengths of links between the first mid-joint and the adjacent joints of the first mid-joint.

Example 48. The method according to Example 47 or another claim or example herein, wherein the objects are spheres.

Example 49. The method according to Example 42 or another claim or example herein, wherein the perimeter of the intersection comprises at least one of a disk, a point, is undefined, or presents an ambiguous subspace.

Example 50. The method according to Example 42 or another claim or example herein, wherein the adjacent joints of the first mid-joint comprise the effector and the root.

Example 51. The method according to Example 42 or another claim or example herein, wherein the adjacent joints of the first mid-joint are a first adjacent joints of the first mid-joint, wherein the kinematic chain further comprises a second mid-joint between the first mid-joint and the effector, wherein the first adjacent joints comprise the second mid-joint and the root, and wherein second adjacent joints of the second mid-joint comprise the effector and the first mid-joint.

Example 52. The method according to Example 51 or another claim or example herein, wherein the objects around adjacent joints of the first mid-joint are first objects around first adjacent joints of the first mid-joint, wherein the intersection of the first objects around the adjacent joints of the first mid-joint is a first intersection of the first objects around the first adjacent joints of the first mid-joint, wherein the subspace of the first mid-joint is a first subspace of the first mid-joint, and further comprising determining second objects around second adjacent joints of the second mid-joint, determining a second intersection of the second objects around the second adjacent joints of the second mid-joint, and determining a second subspace of the second mid-joint according to the second intersection of the second objects around the adjacent joints of the second mid-joint.

Example 53. The method according to Example 52 or another claim or example herein, comprising determining the second subspace of the second mid-joint before determining the first substance of the first mid-joint.

Example 54. The method according to Example 41 or another claim or example herein, wherein the root is fixed.

Example 55. The method according to Example 41 or another claim or example herein, wherein the transformation is to move the effector from a starting location toward a target location, wherein performing the transformation of the kinematic chain according to the subspace of the first mid-joint comprises moving the effector toward the target location.

Example 56. The method according to Example 41 or another claim or example herein, comprising performing the transformation of the kinematic chain in an inverse direction, from the effector to the root.

Example 57. The method according to Example 56 or another claim or example herein, wherein after performing the transformation of the kinematic chain in the inverse direction and prior to moving the first mid-joint, detecting an invalid joint, and then performing the transformation of the kinematic chain in a forward direction.

Example 58. The method according to Example 57 or another claim or example herein, wherein performing the transformation of the kinematic chain in the forward direction comprising use locations for joints of the kinematic chain determined when performing the transformation of the kinematic chain in the inverse direction.

Example 59. The method according to Example 49 or another claim or example herein, wherein the perimeter of the intersection is undefined when the adjacent joints are too far apart for the objects to intersect, when the adjacent joints are coincident, or when a first of the objects around a first of the adjacent joints is within a second of the objects around a second of the adjacent joints, and wherein the perimeter of the intersection presents the ambiguous subspace when a then-current position of the first mid-joint is along a line perpendicular to a center of the intersection.

Example 60. The method according to Example 49 or another claim or example herein, wherein the perimeter of the intersection is undefined because the adjacent joints are coincident and wherein performing the transformation of the kinematic chain according to the subspace of the first mid-joint comprises determining a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 61. The method according to Example 49 or another claim or example herein, wherein the intersection of the objects around the adjacent joints of the first mid-joint presents the ambiguous subspace, and wherein performing the transformation of the kinematic chain according to the subspace of the first mid-joint comprises determining a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 62. The method according to Example 44 or another claim or example herein, wherein the new position closest to the then-current position of the first mid-joint is ambiguous when the then-current position of the first mid-joint is along a line perpendicular to a plane of the intersection.

Example 63. The method according to Example 41 or another claim or example herein, wherein performing the transformation of the kinematic chain according to the subspace of the first mid-joint of the kinematic chain comprises determining that the target location is not within a range of the kinematic chain, determining a nearest in-range position toward the target location along a path to the target location, and performing the transformation of the kinematic chain to move the effector from the starting location to the nearest in-range position toward the target location along the path to the target location.

Example 64. The method according to Example 63 or another claim or example herein, further comprising determining the range of the kinematic chain according to lengths of all links of the kinematic chain and wherein performing the transformation of the kinematic chain to move the effector from the starting location to the nearest in-range position toward the target location along the path to the target location comprises placing the effector on the nearest in-range position toward the target location along the path to the target location and performing the transformation of the kinematic chain according to the subspace of the first mid-joint backward from the effector to the root Example 65. The method according to Example 41 or another claim or example herein, further comprising determining that the target location is not within the range of the kinematic chain, and wherein performing the transformation of the kinematic chain according to the subspace of the kinematic chain comprises placing all joints of the kinematic chain along a line between the root and the target location, wherein a length of the line and a plurality of spaces between the root, the first mid-joint, and the effector are determined according to lengths of respective links between the root, the first mid-joint, and the effector and placing the effector on a nearest in-range position toward the target location along a path to the target location.

Example 66. The method according to Example 41 or another claim or example herein, wherein the kinematic chain comprises a branch.

Example 67. The method according to Example 41 or another claim or example herein, further comprising traversing the kinematic chain and identifying a plurality of branches of the kinematic chain, determining an execution order of the plurality of branches, and performing the transformation on the plurality of branches in the execution order.

Example 68. The method according to Example 67 or another claim or example herein, further comprising detecting externally driven motion in a first set of branches in the plurality of branches and performing the transformation on the plurality of branches in the execution order first in the first set of branches and then performing the transformation in the execution order in any remaining branches after the first set of branches.

Example 69. The method according to Example 68 or another claim or example herein, wherein externally driven motion is motion of the effector in response to motion of the target or motion of the first mid-joint, of another mid-joint, or of the root in response to direct motion provided by a user or an external process.

Example 70. The method according to Example 68 or another claim or example herein, further comprising detecting externally driven motion of a directly-moved mid-joint, wherein the directly-moved mid-joint is in a first branch in the first set of branches, dividing the first branch in the first set of branches into a first sub-branch and a second sub-branch, setting a first start index and a first end index of the first sub-branch and a second start index and a second end index of the second sub-branch, wherein the first end index of the first sub-branch is the directly-moved mid-joint, the second start index of the second sub-branch is the directly-moved mid-joint, the second end index of the second sub-branch is a branch effector of the first branch in the first set of branches.

Example 71. The method according to Example 67 or another claim or example herein, wherein the effector is a first effector and wherein determining the execution order of the plurality of branches comprises walking the kinematic chain to identify a first branch at the root, identifying a first shared joint, identifying a second effector, and identifying a second branch between first shared joint and the second effector, and determining the execution order to comprise the first branch followed by the second branch.

Example 72. The method according to Example 67 or another claim or example herein, wherein performing the transformation of the kinematic chain in the execution order comprises performing a first transformation of a first portion of the kinematic chain controlled by a first branch in the plurality of branches followed by a second transformation of a second portion of the kinematic chain controlled by a second branch in the plurality of branches.

Example 73. The method according to Example 72 or another claim or example herein, wherein performing the transformation of the kinematic chain further comprises determining a first start index and a first end index of the first portion of the kinematic chain controlled by the first branch and a second start index and a second end index of the second portion of the kinematic chain controlled by the second branch.

Example 74. The method according to Example 73 or another claim or example herein, wherein the effector is the first effector and further comprising determining the first start index to be the root, determining the first end index to be the first effector, the second start index is to be a first shared joint, and the second end index to be a second effector.

Example 75. The method according to Example 72 or another claim or example herein, wherein after the first transformation of the first portion of the kinematic chain, locking the first portion of the kinematic chain and then performing the second transformation of the second portion of the kinematic chain, wherein the second transformation of the second portion of the kinematic chain does not move any joint moved in the first transformation of the first portion of the kinematic chain.

Example 76. The method according to Example 72 or another claim or example herein, wherein the effector is a first effector and is associated with the root, further comprising identifying the first branch as a first set of joints between and including the root and the first effector, traversing the first branch from the root toward the first effector, identifying a first shared joint, wherein the first shared joint is connected to the first branch and the second branch, wherein the first shared joint is associated with a second effector, and identifying the second branch as a second set of joints between and including the first shared joint and the second effector.

Example 77. The method according to Example 76, further comprising traversing the second branch from the first shared joint toward the second effector, identifying a second mid-joint between the first mid-joint and the first effector as a second shared joint, wherein the second shared joint is associated with a third effector, and identifying a third branch between the second shared joint and the third effector.

Example 78. The method according to Example 76 or another claim or example herein, wherein performing the transformation of the kinematic chain in the execution order comprises performing the first transformation of the first portion of the kinematic chain controlled by the first branch, followed by the second transformation of the second portion of the kinematic chain controlled by the second branch.

Example 79. The method according to Example 76 or another claim or example herein, further comprising completing traversal of the second branch and returning to continue to traverse the first branch to identify the plurality of branches of the kinematic chain and determining an execution order of the plurality of branches of the kinematic chain.

Example 80. The method according to Example 67 or another claim or example herein, wherein the effector is a first effector, wherein a first branch of the plurality of branches comprises a first sequence of one or more connected joints, wherein the first sequence of one or more connected joints are between the root and the first effector, and wherein a second branch of the plurality of branches comprises a second sequence of one or more connected joints, wherein the second sequence of one or more connected joints are between a shared joint and a second effector.

Example 81. A computer apparatus for inverse kinematics, comprising means to: with a computer processor and a memory, perform a transformation of a kinematic chain to move the effector from a starting location to or toward ("to") a target location, wherein the kinematic chain comprises a root, an effector, and at least a first mid-joint, wherein the first mid-joint is between the root and the effector, wherein means to perform the transformation of the kinematic chain to move the effector from the starting location to the target location comprises means to determine a subspace of the first mid-joint and perform the transformation of the kinematic chain according to the subspace of the first mid-joint.

Example 82. The computer apparatus according to Example 81 or another claim or example herein, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and further comprising means to determine a first object around the effector-proximate joint and a second object around the root-proximate joint, determine an intersection of the first object and the second object ("intersection"), and determine the subspace of the first mid-joint according to a perimeter of the intersection.

Example 83. The computer apparatus according to Example 82 or another claim or example herein, wherein a location of the first object around the effector-proximate joint is based on a new position for the effector-proximate joint and a location of the second object around the root-proximate joint is based on a then-current position of the root-proximate joint and wherein means to perform the transformation of the kinematic chain according to the subspace of the first mid-joint further comprises means to move the effector to the target location and determine a new position for the first mid-joint on the perimeter of the intersection.

Example 84. The computer apparatus according to Example 83 or another claim or example herein, wherein means to determine the new position for the first mid-joint on the perimeter of the intersection comprises means to determine the new position on the perimeter of the intersection closest to a then-current position of the first mid-joint.

Example 85. The computer apparatus according to Example 84 or another claim or example herein, wherein the then-current position of first mid-joint is before movement of the first mid-joint to the new position.

Example 86. The computer apparatus according to Example 83 or another claim or example herein, wherein means to determine the new position closest to the then-current position comprises means to project a vector from the then-current position of the first mid-joint to the perimeter of the intersection along a normal direction of the perimeter of the intersection, wherein the normal direction is perpendicular to a plane of the perimeter of the intersection.

Example 87. The computer apparatus according to Example 82 or another claim or example herein, wherein the objects are defined by lengths of links between the first mid-joint and the adjacent joints of the first mid-joint.

Example 88. The computer apparatus according to Example 87 or another claim or example herein, wherein the objects are spheres.

Example 89. The computer apparatus according to Example 82 or another claim or example herein, wherein the perimeter of the intersection comprises at least one of a disk, a point, is undefined, or presents an ambiguous subspace.

Example 90. The computer apparatus according to Example 82 or another claim or example herein, wherein the adjacent joints of the first mid-joint comprise the effector and the root.

Example 91. The computer apparatus according to Example 82 or another claim or example herein, wherein the adjacent joints of the first mid-joint are a first adjacent joints of the first mid-joint, wherein the kinematic chain further comprises a second mid-joint between the first mid-joint and the effector, wherein the first adjacent joints comprise the second mid-joint and the root, and wherein second adjacent joints of the second mid-joint comprise the effector and the first mid-joint.

Example 92. The computer apparatus according to Example 91 or another claim or example herein, wherein the objects around adjacent joints of the first mid-joint are first objects around first adjacent joints of the first mid-joint, wherein the intersection of the first objects around the adjacent joints of the first mid-joint is a first intersection of the first objects around the first adjacent joints of the first mid-joint, wherein the subspace of the first mid-joint is a first subspace of the first mid-joint, and further comprising means to determine second objects around second adjacent joints of the second mid-joint, determine a second intersection of the second objects around the second adjacent joints of the second mid-joint, and determine a second subspace of the second mid-joint according to the second intersection of the second objects around the adjacent joints of the second mid-joint.

Example 93. The computer apparatus according to Example 92 or another claim or example herein, further comprising performing means to determine the second subspace of the second mid-joint before performing means to determine the first substance of the first mid-joint.

Example 94. The computer apparatus according to Example 81 or another claim or example herein, wherein the root is fixed.

Example 95. The computer apparatus according to Example 81 or another claim or example herein, wherein the transformation is to move the effector from a starting location toward a target location, wherein means to perform the transformation of the kinematic chain according to the subspace of the first mid-joint comprises means to move the effector toward the target location.

Example 96. The computer apparatus according to Example 81 or another claim or example herein, comprising means to perform the transformation of the kinematic chain in an inverse direction, from the effector to the root.

Example 97. The computer apparatus according to Example 96 or another claim or example herein, wherein after performing the transformation of the kinematic chain in the inverse direction and prior to moving the first mid-joint, further comprising means to detect an invalid joint and then perform the transformation of the kinematic chain in a forward direction.

Example 98. The computer apparatus according to Example 97 or another claim or example herein, wherein means to perform the transformation of the kinematic chain in the forward direction comprising means to use locations for joints of the kinematic chain determined when performing the transformation of the kinematic chain in the inverse direction.

Example 99. The computer apparatus according to Example 89 or another claim or example herein, wherein the perimeter of the intersection is undefined when the adjacent joints are too far apart for the objects to intersect, when the adjacent joints are coincident, or when a first of the objects around a first of the adjacent joints is within a second of the objects around a second of the adjacent joints, and wherein the perimeter of the intersection presents the ambiguous subspace when a then-current position of the first mid-joint is along a line perpendicular to a center of the intersection.

Example 100. The computer apparatus according to Example 89 or another claim or example herein, wherein the perimeter of the intersection is undefined because the adjacent joints are coincident and wherein means to perform the transformation of the kinematic chain according to the subspace of the first mid-joint comprises means to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 101. The computer apparatus according to Example 89 or another claim or example herein, wherein the intersection of the objects around the adjacent joints of the first mid-joint presents the ambiguous subspace, and wherein means to perform the transformation of the kinematic chain according to the subspace of the first mid-joint comprises means to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 102. The computer apparatus according to Example 84 or another claim or example herein, wherein the new position closest to the then-current position of the first mid-joint is ambiguous when the then-current position of the first mid-joint is along a line perpendicular to a plane of the intersection.

Example 103. The computer apparatus according to Example 81 or another claim or example herein, wherein means to perform the transformation of the kinematic chain according to the subspace of the first mid-joint of the kinematic chain comprises means to determine that the target location is not within a range of the kinematic chain, determine a nearest in-range position toward the target location along a path to the target location, and perform the transformation of the kinematic chain to move the effector from the starting location to the nearest in-range position toward the target location along the path to the target location.

Example 104. The computer apparatus according to Example 103 or another claim or example herein, further comprising means to determine the range of the kinematic chain according to lengths of all links of the kinematic chain and wherein means to perform the transformation of the kinematic chain to move the effector from the starting location to the nearest in-range position toward the target location along the path to the target location comprises means to place the effector on the nearest in-range position toward the target location along the path to the target location and perform the transformation of the kinematic chain according to the subspace of the first mid-joint backward from the effector to the root Example 105. The computer apparatus according to Example 81 or another claim or example herein, further comprising means to determine that the target location is not within the range of the kinematic chain, and wherein means to perform the transformation of the kinematic chain according to the subspace of the kinematic chain comprises means to place all joints of the kinematic chain along a line between the root and the target location, wherein a length of the line and a plurality of spaces between the root, the first mid-joint, and the effector are determined according to lengths of respective links between the root, the first mid-joint, and the effector and means to place the effector on a nearest in-range position toward the target location along a path to the target location.

Example 106. The computer apparatus according to Example 81 or another claim or example herein, wherein the kinematic chain comprises a branch.

Example 107. The computer apparatus according to Example 81 or another claim or example herein, further comprising means to traverse the kinematic chain and identify a plurality of branches of the kinematic chain, determine an execution order of the plurality of branches, and perform the transformation on the plurality of branches in the execution order.

Example 108. The computer apparatus according to Example 107 or another claim or example herein, further comprising means to detect externally driven motion in a first set of branches in the plurality of branches and perform the transformation on the plurality of branches in the execution order first in the first set of branches and then perform the transformation in the execution order in any remaining branches after the first set of branches.

Example 109. The computer apparatus according to Example 108 or another claim or example herein, wherein externally driven motion is motion of the effector in response to motion of the target or motion of the first mid-joint, of another mid-joint, or of the root in response to direct motion provided by a user or an external process.

Example 110. The computer apparatus according to Example 108 or another claim or example herein, further comprising means to detect externally driven motion of a directly-moved mid-joint, wherein the directly-moved mid-joint is in a first branch in the first set of branches, divide the first branch in the first set of branches into a first sub-branch and a second sub-branch, set a first start index and a first end index of the first sub-branch and a second start index and a second end index of the second sub-branch, wherein the first end index of the first sub-branch is the directly-moved mid-joint, the second start index of the second sub-branch is the directly-moved mid-joint, the second end index of the second sub-branch is a branch effector of the first branch in the first set of branches.

Example 111. The computer apparatus according to Example 107 or another claim or example herein, wherein the effector is a first effector and wherein means to determine the execution order of the plurality of branches comprises means to walk the kinematic chain to identify a first branch at the root, identify a first shared joint, identify a second effector, and identify a second branch between first shared joint and the second effector, and determine the execution order as comprising the first branch followed by the second branch.

Example 112. The computer apparatus according to Example 107 or another claim or example herein, wherein means to perform the transformation of the kinematic chain in the execution order comprises means to perform a first transformation of a first portion of the kinematic chain controlled by a first branch in the plurality of branches followed by a second transformation of a second portion of the kinematic chain controlled by a second branch in the plurality of branches.

Example 113. The computer apparatus according to Example 112 or another claim or example herein, wherein means to perform the transformation of the kinematic chain further comprises means to determine a first start index and a first end index of the first portion of the kinematic chain controlled by the first branch and a second start index and a second end index of the second portion of the kinematic chain controlled by the second branch.

Example 114. The computer apparatus according to Example 113 or another claim or example herein, wherein the effector is the first effector and further comprising means to determine the first start index to be the root, the first end index to be the first effector, the second start index is to be a first shared joint, and the second end index to be a second effector.

Example 115. The computer apparatus according to Example 112 or another claim or example herein, wherein after the first transformation of the first portion of the kinematic chain, further comprising means to lock the first portion of the kinematic chain and then perform the second transformation of the second portion of the kinematic chain, wherein the second transformation of the second portion of the kinematic chain does not move any joint moved in the first transformation of the first portion of the kinematic chain.

Example 116. The computer apparatus according to Example 112 or another claim or example herein, wherein the effector is a first effector and is associated with the root, further comprising means to identify the first branch as a first set of joints between and including the root and the first effector, traverse the first branch from the root toward the first effector, identify a first shared joint, wherein the first shared joint is connected to the first branch and the second branch, wherein the first shared joint is associated with a second effector, and identify the second branch as a second set of joints between and including the first shared joint and the second effector.

Example 117. The computer apparatus according to Example 116 or another claim or example herein, further comprising means to traverse the second branch from the first shared joint toward the second effector, identify a second mid-joint between the first mid-joint and the first effector as a second shared joint, wherein the second shared joint is associated with a third effector, and identify a third branch between the second shared joint and the third effector.

Example 118. The computer apparatus according to Example 116 or another claim or example herein, wherein means to perform the transformation of the kinematic chain in the execution order comprises means to perform the first transformation of the first portion of the kinematic chain controlled by the first branch, followed by the second transformation of the second portion of the kinematic chain controlled by the second branch.

Example 119. The computer apparatus according to Example 116 or another claim or example herein, further comprising means to complete traversal of the second branch and return to continue to traverse the first branch to identify the plurality of branches of the kinematic chain and determining an execution order of the plurality of branches of the kinematic chain.

Example 120. The computer apparatus according to Example 107 or another claim or example herein, wherein the effector is a first effector, wherein a first branch of the plurality of branches comprises a first sequence of one or more connected joints, wherein the first sequence of one or more connected joints are between the root and the first effector, and wherein a second branch of the plurality of branches comprises a second sequence of one or more connected joints, wherein the second sequence of one or more connected joints are between a shared joint and a second effector.

Example 121. One or more computer-readable media comprising instructions that cause a computer device, in response to execution of the instructions by a processor of the computer device, to: perform a transformation of a kinematic chain to move an effector from a starting location to or toward ("to") a target location, wherein the kinematic chain comprises a root, the effector, and at least a first mid-joint, wherein the first mid-joint is between the root and the effector, wherein to perform the transformation of the kinematic chain to move the effector from the starting location to the target location comprises to determine a subspace of the first mid-joint and to perform the transformation of the kinematic chain according to the subspace of the first mid-joint.

Example 122. The computer-readable media according to Example 121 or another claim or example herein, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and wherein the instructions are further to cause to the computer device to determine a first object around the effector-proximate joint and a second object around the root-proximate joint, determine an intersection of the first object and the second object ("intersection"), and determine the subspace of the first mid-joint according to a perimeter of the intersection.

Example 123. The computer-readable media according to Example 122 or another claim or example herein, wherein a location of the first object around the effector-proximate joint is based on a new position for the effector-proximate joint and a location of the second object around the root-proximate joint is based on a then-current position of the root-proximate joint and wherein to perform the transformation of the kinematic chain according to the subspace of the first mid-joint further comprises to move the effector to the target location and determine a new position for the first mid-joint on the perimeter of the intersection.

Example 124. The computer-readable media according to Example 123 or another claim or example herein, wherein to determine the new position for the first mid-joint on the perimeter of the intersection comprises to determine the new position on the perimeter of the intersection closest to a then-current position of the first mid-joint.

Example 125. The computer-readable media according to Example 124 or another claim or example herein, wherein the then-current position of first mid-joint is before movement of the first mid-joint to the new position.

Example 126. The computer-readable media according to Example 123 or another claim or example herein, wherein to determine the new position closest to the then-current position comprises to project a vector from the then-current position of the first mid-joint to the perimeter of the intersection along a normal direction of the perimeter of the intersection, wherein the normal direction is perpendicular to a plane of the perimeter of the intersection.

Example 127. The computer-readable media according to Example 122 or another claim or example herein, wherein the objects are defined by lengths of links between the first mid-joint and the adjacent joints of the first mid-joint.

Example 128. The computer-readable media according to Example 127 or another claim or example herein, wherein the objects are spheres.

Example 129. The computer-readable media according to Example 122 or another claim or example herein, wherein the perimeter of the intersection comprises at least one of a disk, a point, is undefined, or presents an ambiguous subspace.

Example 130. The computer-readable media according to Example 122 or another claim or example herein, wherein the adjacent joints of the first mid-joint comprise the effector and the root.

Example 131. The computer-readable media according to Example 122 or another claim or example herein, wherein the adjacent joints of the first mid-joint are a first adjacent joints of the first mid-joint, wherein the kinematic chain further comprises a second mid-joint between the first mid-joint and the effector, wherein the first adjacent joints comprise the second mid-joint and the root, and wherein second adjacent joints of the second mid-joint comprise the effector and the first mid-joint.

Example 132. The computer-readable media according to Example 131 or another claim or example herein, wherein the objects around adjacent joints of the first mid-joint are first objects around first adjacent joints of the first mid-joint, wherein the intersection of the first objects around the adjacent joints of the first mid-joint is a first intersection of the first objects around the first adjacent joints of the first mid-joint, wherein the subspace of the first mid-joint is a first subspace of the first mid-joint, and wherein the instructions are further to cause the computer device to determine second objects around second adjacent joints of the second mid-joint, determine a second intersection of the second objects around the second adjacent joints of the second mid-joint, and determine a second subspace of the second mid-joint according to the second intersection of the second objects around the adjacent joints of the second mid-joint.

Example 133. The computer-readable media according to Example 132 or another claim or example herein, wherein the instructions are further to cause the computer device to determine the second subspace of the second mid-joint before it is to cause the computer device to determine the first substance of the first mid-joint.

Example 134. The computer-readable media according to Example 121 or another claim or example herein, wherein the root is fixed.

Example 135. The computer-readable media according to Example 121 or another claim or example herein, wherein the transformation is to move the effector from a starting location toward a target location, wherein to perform the transformation of the kinematic chain according to the subspace of the first mid-joint comprises to move the effector toward the target location.

Example 136. The computer-readable media according to Example 121 or another claim or example herein, wherein the instructions are further to cause the computer device to perform the transformation of the kinematic chain in an inverse direction, from the effector to the root.

Example 137. The computer-readable media according to Example 136 or another claim or example herein, wherein after performing the transformation of the kinematic chain in the inverse direction and prior to moving the first mid-joint, the instructions are further to cause the computer device to detect an invalid joint and then perform the transformation of the kinematic chain in a forward direction.

Example 138. The computer-readable media according to Example 137 or another claim or example herein, wherein to perform the transformation of the kinematic chain in the forward direction the instructions are further to cause the computer device to use locations for joints of the kinematic chain determined when performing the transformation of the kinematic chain in the inverse direction.

Example 139. The computer-readable media according to Example 129 or another claim or example herein, wherein the perimeter of the intersection is undefined when the adjacent joints are too far apart for the objects to intersect, when the adjacent joints are coincident, or when a first of the objects around a first of the adjacent joints is within a second of the objects around a second of the adjacent joints, and wherein the perimeter of the intersection presents the ambiguous subspace when a then-current position of the first mid-joint is along a line perpendicular to a center of the intersection.

Example 140. The computer-readable media according to Example 129 or another claim or example herein, wherein the perimeter of the intersection is undefined because the adjacent joints are coincident and wherein to perform the transformation of the kinematic chain according to the subspace of the first mid-joint the instructions are further to cause the computer device to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 141. The computer-readable media according to Example 129 or another claim or example herein, wherein the intersection of the objects around the adjacent joints of the first mid-joint presents the ambiguous subspace, and wherein to perform the transformation of the kinematic chain according to the subspace of the first mid-joint the instructions are further to cause the computer device to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

Example 142. The computer-readable media according to Example 124 or another claim or example herein, wherein the new position closest to the then-current position of the first mid-joint is ambiguous when the then-current position of the first mid-joint is along a line perpendicular to a plane of the intersection.

Example 143. The computer-readable media according to Example 121 or another claim or example herein, wherein to perform the transformation of the kinematic chain according to the subspace of the first mid-joint of the kinematic chain comprises to determine that the target location is not within a range of the kinematic chain, determine a nearest in-range position toward the target location along a path to the target location, and perform the transformation of the kinematic chain to move the effector from the starting location to the nearest in-range position toward the target location along the path to the target location.

Example 144. The computer-readable media according to Example 143 or another claim or example herein, wherein the instructions are further to cause the computer device to determine the range of the kinematic chain according to lengths of all links of the kinematic chain and wherein to perform the transformation of the kinematic chain to move the effector from the starting location to the nearest in-range position toward the target location along the path to the target location comprises to place the effector on the nearest in-range position toward the target location along the path to the target location and perform the transformation of the kinematic chain according to the subspace of the first mid-joint backward from the effector to the root Example 145. The computer-readable media according to Example 121 or another claim or example herein, wherein the instructions are further to cause the computer device to determine that the target location is not within the range of the kinematic chain, and wherein to perform the transformation of the kinematic chain according to the subspace of the kinematic chain comprises to place all joints of the kinematic chain along a line between the root and the target location, wherein a length of the line and a plurality of spaces between the root, the first mid-joint, and the effector are determined according to lengths of respective links between the root, the first mid-joint, and the effector and to place the effector on a nearest in-range position toward the target location along a path to the target location.

Example 146. The computer-readable media according to Example 121 or another claim or example herein, wherein the kinematic chain comprises a branch.

Example 147. The computer-readable media according to Example 121 or another claim or example herein, wherein the instructions are further to cause the computer device to traverse the kinematic chain and identify a plurality of branches of the kinematic chain, determine an execution order of the plurality of branches, and perform the transformation on the plurality of branches in the execution order.

Example 148. The computer-readable media according to Example 147 or another claim or example herein, wherein the instructions are further to cause the computer device to detect externally driven motion in a first set of branches in the plurality of branches and perform the transformation on the plurality of branches in the execution order first in the first set of branches and then perform the transformation in the execution order in any remaining branches after the first set of branches.

Example 149. The computer-readable media according to Example 148 or another claim or example herein, wherein externally driven motion is motion of the effector in response to motion of the target or motion of the first mid-joint, of another mid-joint, or of the root in response to direct motion provided by a user or an external process.

Example 150. The computer-readable media according to Example 148 or another claim or example herein, wherein the instructions are further to cause the computer device to detect externally driven motion of a directly-moved mid-joint, wherein the directly-moved mid-joint is in a first branch in the first set of branches, divide the first branch in the first set of branches into a first sub-branch and a second sub-branch, set a first start index and a first end index of the first sub-branch and a second start index and a second end index of the second sub-branch, wherein the first end index of the first sub-branch is the directly-moved mid-joint, the second start index of the second sub-branch is the directly-moved mid-joint, the second end index of the second sub-branch is a branch effector of the first branch in the first set of branches.

Example 151. The computer-readable media according to Example 147 or another claim or example herein, wherein the effector is a first effector and wherein to determine the execution order of the plurality of branches comprises to walk the kinematic chain to identify a first branch at the root, identify a first shared joint, identify a second effector, and identify a second branch between first shared joint and the second effector, and determine the execution order as comprising the first branch followed by the second branch.

Example 152. The computer-readable media according to Example 147 or another claim or example herein, wherein to perform the transformation of the kinematic chain in the execution order comprises to perform a first transformation of a first portion of the kinematic chain controlled by a first branch in the plurality of branches followed by a second transformation of a second portion of the kinematic chain controlled by a second branch in the plurality of branches.

Example 153. The computer-readable media according to Example 152 or another claim or example herein, wherein to perform the transformation of the kinematic chain further comprises to determine a first start index and a first end index of the first portion of the kinematic chain controlled by the first branch and a second start index and a second end index of the second portion of the kinematic chain controlled by the second branch.

Example 154. The computer-readable media according to Example 153 or another claim or example herein, wherein the effector is the first effector and wherein the instructions are further to cause the computer device to determine the first start index to be the root, the first end index to be the first effector, the second start index is to be a first shared joint, and the second end index to be a second effector.

Example 155. The computer-readable media according to Example 152 or another claim or example herein, wherein after the first transformation of the first portion of the kinematic chain, the instructions are further to cause the computer device to lock the first portion of the kinematic chain and then perform the second transformation of the second portion of the kinematic chain, wherein the second transformation of the second portion of the kinematic chain does not move any joint moved in the first transformation of the first portion of the kinematic chain.

Example 156. The computer-readable media according to Example 152 or another claim or example herein, wherein the effector is a first effector and is associated with the root, and wherein the instructions are further to cause the computer device to identify the first branch as a first set of joints between and including the root and the first effector, traverse the first branch from the root toward the first effector, identify a first shared joint, wherein the first shared joint is connected to the first branch and the second branch, wherein the first shared joint is associated with a second effector, and identify the second branch as a second set of joints between and including the first shared joint and the second effector.

Example 157. The computer-readable media according to Example 156 or another claim or example herein, wherein the instructions are further to cause the computer device to traverse the second branch from the first shared joint toward the second effector, identify a second mid-joint between the first mid-joint and the first effector as a second shared joint, wherein the second shared joint is associated with a third effector, and identify a third branch between the second shared joint and the third effector.

Example 158. The computer-readable media according to Example 156 or another claim or example herein, wherein to perform the transformation of the kinematic chain in the execution order comprises to perform the first transformation of the first portion of the kinematic chain controlled by the first branch, followed by the second transformation of the second portion of the kinematic chain controlled by the second branch.

Example 159. The computer-readable media according to Example 156 or another claim or example herein, wherein the instructions are further to cause the computer device to complete traversal of the second branch and return to continue to traverse the first branch to identify the plurality of branches of the kinematic chain and determining an execution order of the plurality of branches of the kinematic chain.

Example 160. The computer-readable media according to Example 147 or another claim or example herein, wherein the effector is a first effector, wherein a first branch of the plurality of branches comprises a first sequence of one or more connected joints, wherein the first sequence of one or more connected joints are between the root and the first effector, and wherein a second branch of the plurality of branches comprises a second sequence of one or more connected joints, wherein the second sequence of one or more connected joints are between a shared joint and a second effector.

The invention claimed is:

1. An apparatus for inverse kinematics, comprising:
a computer processor and a memory having stored therein computer-readable instructions; and
wherein the computer-readable instructions when executed by the processor configures the processor to perform a transformation of a kinematic chain and control movement of the kinematic chain based on the transformation of the kinematic chain, wherein the kinematic chain comprises a root, an effector, and at least a first mid-joint, wherein the first mid-joint is between the root and the effector, wherein the transformation includes moving the effector from a starting location to or toward ("to") a target location, wherein to perform the transformation of the kinematic chain to move the effector from the starting location to the target location, the processor is configured to determine a subspace of the first mid-joint, and is configured to perform the transformation of the kinematic chain according to the subspace of the first mid-joint, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and wherein the processor upon executing the computer-readable instructions is configured to determine a first object around the effector-proximate joint and a second object around the root-proximate joint, is configured to determine an intersection of the first object and the second object ("intersection"), and is configured to determine the subspace of the first mid-joint according to a perimeter of the intersection, wherein the first object is determined by determining a three-dimensional space that at least partially surrounds the effector-proximate joint that a first link connected to the effector-proximate joint can freely rotate around the effector-proximate joint, and wherein the second object is determined by determining a three-dimensional space that at least partially surrounds the root-proximate joint that a second link connected to the root-proximate joint can freely rotate around the root-proximate joint.

2. The apparatus according to claim 1, wherein a location of the first object around the effector-proximate joint is based on a new position for the effector-proximate joint and a location of the second object around the root-proximate joint is based on a then-current position of the root-proximate joint and wherein to perform the transformation of the kinematic chain according to the subspace of the first mid-joint, the processor upon executing the computer-readable instructions is configured to move the effector to the target location, and determine a new position for the first mid-joint on the perimeter of the intersection.

3. The apparatus according to claim 2, wherein to determine the new position for the first mid-joint on the perimeter of the intersection, the processor upon executing the computer-readable instructions is configured to determine the new position on the perimeter of the intersection closest to a then-current position of the first mid-joint.

4. The apparatus according to claim 2, wherein to determine the new position closest to the then-current position, the processor upon executing the computer-readable instructions is configured to project a vector from the then-current position of the first mid-joint to the perimeter of the intersection along a normal direction of the perimeter of the intersection, wherein the normal direction is perpendicular to a plane of the perimeter of the intersection.

5. The apparatus according to claim 1, wherein the perimeter of the intersection comprises at least one of a disk, a point, is undefined, or presents an ambiguous subspace.

6. The apparatus according to claim 1, wherein the processor upon executing the computer-readable instructions is configured to perform the transformation of the kinematic chain in an inverse direction, from the effector to the root, wherein after performing the transformation of the kinematic chain in the inverse direction and prior to moving the first mid-joint, the processor upon executing the computer-readable instructions is configured to detect an invalid joint and is to perform the transformation of the kinematic chain in a forward direction.

7. The apparatus according to claim 5, wherein the perimeter of the intersection is undefined because the adjacent joints are coincident and wherein to perform the transformation of the kinematic chain according to the subspace of the first mid-joint the processor upon executing the computer-readable instructions is configured to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

8. The apparatus according to claim 5, wherein the intersection of the objects around the adjacent joints of the first mid-joint presents the ambiguous subspace, and wherein to perform the transformation of the kinematic chain according to the subspace of the first mid-joint the processor upon executing the computer-readable instructions is configured to determine a new position for the first mid-joint along a direction between a then-current location of the first mid-joint and a then-current location of a first of the adjacent joints, multiplied by a length of a link between the first mid-joint and the first of the adjacent joints, plus a vector coordinate representation of the first of the adjacent joints.

9. The apparatus according to claim 6, wherein to perform the transformation of the kinematic chain in the forward direction, the processor upon executing the computer-readable instructions is configured to use locations for joints of the kinematic chain determined when performing the transformation of the kinematic chain in the inverse direction.

10. The apparatus according to claim 1, wherein the processor upon executing the computer-readable instructions is configured to traverse the kinematic chain and identify a plurality of branches of the kinematic chain, is configured to determine an execution order of the plurality of branches, and wherein the processor is further configured to perform the transformation on the plurality of branches in the execution order.

11. The apparatus according to claim 10, where the processor upon executing the computer-readable instructions is further configured to detect externally driven motion in a first set of branches in the plurality of branches, and is configured to perform the transformation on the plurality of branches in the execution order first in the first set of branches and then is configured to perform the transformation in the execution order in any remaining branches after the first set of branches.

12. The apparatus according to claim 10, wherein to perform the transformation of the kinematic chain in the execution order the processor upon executing the computer-readable instructions is configured to perform a first transformation of a first portion of the kinematic chain controlled by a first branch in the plurality of branches followed by a second transformation of a second portion of the kinematic chain controlled by a second branch in the plurality of branches.

13. The apparatus according to claim 12, wherein to perform the transformation of the kinematic chain the processor upon executing the computer-readable instructions is further configured to determine a first start index and a first end index of the first portion of the kinematic chain controlled by the first branch and a second start index and a second end index of the second portion of the kinematic chain controlled by the second branch.

14. The apparatus according to claim 13, wherein the effector is the first effector and wherein the processor upon executing the computer-readable instructions is configured to determine the first start index to be the root, and wherein the inverse kinematic module is further configured to determine the first end index to be the first effector, the second start index is to be a first shared joint, and the second end index to be a second effector.

15. The apparatus according to claim 12, wherein after the first transformation of the first portion of the kinematic chain, the processor upon executing the computer-readable instructions is configured to lock the first portion of the kinematic chain and to then perform the second transformation of the second portion of the kinematic chain, wherein the second transformation of the second portion of the kinematic chain does not move any joint moved in the first transformation of the first portion of the kinematic chain.

16. The apparatus according to claim 12, wherein the effector is a first effector and is associated with the root, wherein the processor upon executing the computer-readable instructions is configured to identify the first branch as a first set of joints between and including the root and the first effector, wherein the inverse kinematic module is configured to traverse the first branch from the root toward the first effector, is configured to identify a first shared joint, wherein the first shared joint is connected to the first branch and the second branch, wherein the first shared joint is associated with a second effector, wherein the processor upon executing the computer-readable instructions is further configured to identify the second branch as a second set of joints between and including the first shared joint and the second effector.

17. The apparatus according to claim 16, wherein the processor upon executing the computer-readable instructions is configured to traverse the second branch from the first shared joint toward the second effector, is configured to identify a second mid-joint between the first mid-joint and the first effector as a second shared joint, wherein the second shared joint is associated with a third effector, and is further configured to identify a third branch between the second shared joint and the third effector.

18. The apparatus according to claim 16, wherein to perform the transformation of the kinematic chain in the execution order the processor upon executing the computer-readable instructions is configured to perform the first transformation of the first portion of the kinematic chain controlled by the first branch, followed by the second transformation of the second portion of the kinematic chain controlled by the second branch.

19. A computer implemented method for inverse kinematics, comprising:
performing, by a computer processor, a transformation of a kinematic chain; controlling movement of the kinematic chain based on the transformation of the kinematic chain, wherein the kinematic chain comprises a root, an effector, and at least a first mid-joint, wherein the first mid-joint is between the root and the effector, wherein performing the transformation of the kinematic chain includes moving the effector from a starting location to or toward ("to") a target location by determining a subspace of the first mid-joint and performing the transformation of the kinematic chain according to the subspace of the first mid-joint, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and further comprising determining a first object around the effector-proximate joint and a second object around the root-proximate joint, determining an intersection of the first object and the second object ("intersection"), and determining the subspace of the first mid-joint according to a perimeter of the intersection, wherein a location of the first object around the effector-proximate joint is based on a new position for the effector-proximate joint and a location of the second object around the root-proximate joint is based on a then-current position of the root-proximate joint and wherein performing the transformation of the kinematic chain according to the subspace of the first mid-joint further comprises moving the effector to the target location and determining a new position for the first mid-joint on the perimeter of the intersection, wherein determining the new position for the first mid-joint on the perimeter of the intersection comprises determining the new position on the perimeter of the intersection closest to a then-current position of the first mid-joint, wherein the first object is determined by determining a three-dimensional space that at least partially surrounds the effector-proximate joint that a first link connected to the effector-proximate joint can freely rotate around the effector-proximate joint, and wherein the second object is determined by determining a three-dimensional space that at least partially surrounds the root-proximate joint that a second link connected to the root-proximate joint can freely rotate around the root-proximate joint.

20. One or more computer-readable media comprising instructions that cause a computer device, in response to execution of the instructions by a processor of the computer device, to:
perform a transformation of a kinematic chain; control movement of the kinematic chain based on the transformation of the kinematic chain, wherein the kinematic chain comprises a root, the effector, and at least a first mid-joint, wherein the first mid-joint is between the root and the effector, wherein to perform the transformation of the kinematic chain includes moving the effector from a starting location to or toward ("to") a target location by determining a subspace of the first mid-joint and perform the transformation of the kinematic chain according to the subspace of the first mid-joint, wherein the kinematic chain comprises adjacent joints of the first mid-joint, wherein the adjacent joints of the first mid-joint comprise an effector-proximate joint and a root-proximate joint, wherein the effector-proximate joint is either the effector or a mid-joint closer to the effector than the first mid-joint and wherein the root-proximate joint is either the root or a mid-joint closer to the root than the first mid-joint, and wherein the instructions are further to cause to computer device to determine a first object around the effector-proximate joint and a second object around the root-proximate joint, determine an intersection of the first object and the second object ("intersection"), and determine the subspace of the first mid-joint according to a perimeter of the intersection, wherein a location of the first object around the effector-proximate joint is based on a new position for the effector-proximate joint and a location of the second object around the root-proximate joint is based on a then-current position of the root-proximate joint and wherein to perform the transformation of the kinematic chain according to the subspace of the first mid-joint further comprises moving the effector to the target location and determine a new position for the first mid-joint on the perimeter of the intersection, wherein the first object is determined by determining a three-dimensional space that at least partially surrounds the effector-proximate joint that a first link connected to the effector-proximate joint can freely rotate around the effector-proximate joint, and wherein the second object is determined by determining a three-dimensional space that at least partially surrounds the root-proximate joint that a second link connected to the root-proximate joint can freely rotate around the root-proximate joint.

\* \* \* \* \*